US 011640071B2

(12) United States Patent
Sakae et al.

(10) Patent No.: US 11,640,071 B2
(45) Date of Patent: May 2, 2023

(54) LENS BARREL AND IMAGING APPARATUS

(71) Applicant: SONY CORPORATION, Tokyo (JP)

(72) Inventors: Kazuki Sakae, Tokyo (JP); Satoshi Hayakawa, Kanagawa (JP); Takashi Warashina, Kanagawa (JP); Keishi Iwana, Tokyo (JP)

(73) Assignee: SONY CORPORATION, Tokyo (JP)

( * ) Notice: Subject to any disclaimer, the term of this patent is extended or adjusted under 35 U.S.C. 154(b) by 432 days.

(21) Appl. No.: 16/646,769

(22) PCT Filed: Aug. 3, 2018

(86) PCT No.: PCT/JP2018/029291
§ 371 (c)(1),
(2) Date: Mar. 12, 2020

(87) PCT Pub. No.: WO2019/058785
PCT Pub. Date: Mar. 28, 2019

(65) Prior Publication Data
US 2020/0292841 A1 Sep. 17, 2020

(30) Foreign Application Priority Data
Sep. 21, 2017 (JP) .............................. JP2017-181765

(51) Int. Cl.
*G02B 27/64* (2006.01)
*G03B 5/06* (2021.01)
(Continued)

(52) U.S. Cl.
CPC ............. *G02B 27/646* (2013.01); *G03B 5/02* (2013.01); *G03B 5/06* (2013.01); *H04N 5/23287* (2013.01);
(Continued)

(58) Field of Classification Search
None
See application file for complete search history.

(56) References Cited

U.S. PATENT DOCUMENTS

| 2010/0183288 A1 | 7/2010 | Kudoh |
| 2010/0202766 A1 | 8/2010 | Takizawa et al. |
| 2011/0050921 A1 | 3/2011 | Noto |

(Continued)

FOREIGN PATENT DOCUMENTS

| CN | 1713014 A | 12/2005 |
| CN | 101772730 A | 7/2010 |

(Continued)

OTHER PUBLICATIONS

International Search Report and Written Opinion of PCT Application No. PCT/JP2018/029291, dated Nov. 6, 2018, 09 pages of ISRWO.

(Continued)

*Primary Examiner* — Derek S. Chapel
(74) *Attorney, Agent, or Firm* — Chip Law Group

(57) ABSTRACT

Enhancement of the functionality of image stabilization is achieved while smooth operation of a movable body is ensured. A lens barrel includes a lens unit including at least one lens, a first magnet for performing image stabilization in at least one of a first direction or a second direction, a second magnet for performing image stabilization in a rolling direction, a first coil that forms a magnetic circuit together with the first magnet, and moves the lens unit in at least one of the first direction or the second direction, a second coil that forms a magnetic circuit together with the second magnet, and rotates the lens unit in the rolling direction, and a mounting body having the first magnet and the second magnet mounted thereon. When the lens unit is moved in at least one of the first direction or the second direction, the (Continued)

first magnet, the second magnet, and the mounting body are integrally operated.

19 Claims, 21 Drawing Sheets

(51) Int. Cl.
  *G03B 5/02* (2021.01)
  *H04N 5/232* (2006.01)
(52) U.S. Cl.
  CPC ........... *G03B 2205/0007* (2013.01); *G03B 2205/0015* (2013.01); *G03B 2205/0023* (2013.01); *G03B 2205/0069* (2013.01)

(56) References Cited

U.S. PATENT DOCUMENTS

| | | | |
|---|---|---|---|
| 2013/0176629 A1 | 7/2013 | Nakayama et al. | |
| 2013/0321931 A1 | 12/2013 | Nakayama | |
| 2015/0248017 A1* | 9/2015 | Hattori | G02B 27/646 |
| | | | 359/557 |
| 2018/0309931 A1* | 10/2018 | Minamisawa | G02B 27/646 |

FOREIGN PATENT DOCUMENTS

| | | |
|---|---|---|
| CN | 103197487 A | 7/2013 |
| CN | 103200360 A | 7/2013 |
| CN | 103454829 A | 12/2013 |
| JP | 2011-053241 A | 3/2011 |
| JP | 2013-140285 A | 7/2013 |
| JP | 2013-246413 A | 12/2013 |
| JP | 2015-082072 A | 4/2015 |
| JP | 2017-016114 A | 1/2017 |
| KR | 10-2011-0040740 A | 4/2011 |
| TW | 201027231 A | 7/2010 |
| TW | 201217849 A | 5/2012 |
| WO | 2010/010712 A1 | 1/2010 |

OTHER PUBLICATIONS

Office Action for CN Patent Application No. 201880059469.9, dated Jun. 1, 2021, 09 pages of English Translation and 06 pages of Office Action.

Office Action for TW Patent Application No. 11021166390, dated Nov. 30, 2021, 06 pages of Office Action.

* cited by examiner

LENS BARREL AND IMAGING APPARATUS

CROSS REFERENCE TO RELATED APPLICATIONS

This application is a U.S. National Phase of International Patent Application No. PCT/JP2018/029291 filed on Aug. 3, 2018, which claims priority benefit of Japanese Patent Application No. JP 2017-181765 filed in the Japan Patent Office on Sep. 21, 2017. Each of the above-referenced applications is hereby incorporated herein by reference in its entirety.

TECHNICAL FIELD

The present technology relates to the technical fields of a lens barrel configured to perform image stabilization in at least one of a first direction or a second direction and in a rolling direction, and an imaging apparatus including the lens barrel.

BACKGROUND ART

Some imaging apparatuses, such as video cameras and still cameras, include lens barrels having an image stabilization function. The image stabilization function achieves image stabilization or the like by operating a lens or an imaging element in a direction orthogonal to an optical axis direction or the like with the use of a magnetic circuit including a magnet and a coil, for example.

As such imaging apparatuses, for example, there is an imaging apparatus in which a movable body is movable (pivotable) in a direction around a first fulcrum axis orthogonal to an optical axis, for example, a pitching direction, and a direction around a second fulcrum axis orthogonal to both of the optical axis and the first fulcrum axis, for example, a yawing direction (for example, see PTL 1).

In the imaging apparatus described in PTL 1, the movable body is configured to operate in the two different directions so that image stabilization is favorably performed and enhancement of the image quality of captured images is therefore achieved.

CITATION LIST

Patent Literature

[PTL 1]
Japanese Patent Laid-open No. 2017-16114

SUMMARY

Technical Problem

Incidentally, in the imaging apparatus described in PTL 1, image stabilization is performed and enhancement of image quality is achieved with the movable body configured to operate in the two different directions. However, camera shake occurs in various directions other than the left-right direction and the up-down direction.

Thus, in order to achieve more enhanced image quality, more enhancement of the functionality of the image stabilization function is desirably achieved while smooth operation of the movable body is ensured.

Accordingly, a lens barrel and an imaging apparatus of the present technology are aimed at overcoming the problem described above, to thereby achieve enhancement of the functionality of image stabilization without preventing smooth operation of the movable body.

Solution to Problem

Firstly, in order to solve the problem described above, according to the present technology, there is provided a lens barrel including: a lens unit including at least one lens; a first magnet for performing image stabilization in at least one of a first direction or a second direction; a second magnet for performing image stabilization in a rolling direction; a first coil that forms a magnetic circuit together with the first magnet, and moves the lens unit in at least one of the first direction or the second direction; a second coil that forms a magnetic circuit together with the second magnet, and rotates the lens unit in the rolling direction; and a mounting body having the first magnet and the second magnet mounted thereon, in which, when the lens unit is moved in at least one of the first direction or the second direction, the first magnet, the second magnet, and the mounting body are integrally operated.

With this, when the lens unit is moved in at least one of the first direction or the second direction, the positional relationship between the first magnet and the second magnet for performing image stabilization is not changed.

Secondly, the lens barrel according to the above-mentioned present technology desirably further includes a yoke including a first magnet mounting portion having the first magnet mounted thereon and a second magnet mounting portion having the second magnet mounted thereon.

With this, special yokes for mounting the first magnet and the second magnet are not necessary.

Thirdly, in the lens barrel according to the above-mentioned present technology, the first magnet mounting portion and the second magnet mounting portion are desirably positioned so as to be orthogonal to each other.

With this, the lens barrel is not increased in size in one direction.

Fourthly, in the lens barrel according to the above-mentioned present technology, the first magnet and the second magnet are each desirably formed into a plate shape, the first magnet is desirably mounted on the first magnet mounting portion so as to face a direction orthogonal to an optical axis direction, and the second magnet is desirably mounted on the second magnet mounting portion so as to face the optical axis direction.

With this, the lens barrel is not increased in size in the direction orthogonal to the optical axis direction and in the optical axis direction.

Fifthly, in the lens barrel according to the above-mentioned present technology, a plurality of the first magnet mounting portions and a plurality of the first magnets are desirably provided, and the plurality of first magnet mounting portions is desirably positioned so as to be separated from each other in a direction around an optical axis.

With this, the plurality of first magnets is positioned so as not to be arranged in the optical axis direction.

Sixthly, in the lens barrel according to the above-mentioned present technology, the second magnet mounting portion and the second magnet are each desirably formed into a circular shape, and the lens unit is desirably partly inserted through the second magnet mounting portion and the second magnet.

With this, the second magnet mounting portion and the second magnet overlap the part of the lens unit in the insertion direction of the lens unit.

Seventhly, in the lens barrel according to the above-mentioned present technology, the second magnet and the second coil are desirably positioned inside an outer periphery of the lens unit.

With this, the second magnet and the second coil do not protrude from the outer periphery of the lens unit.

Eighthly, the lens barrel according to the above-mentioned present technology desirably further includes a pitch magnet and a yaw magnet serving as the first magnet and a pitch coil and a yaw coil serving as the first coil, in which the lens unit is desirably movable in the first direction and the second direction.

With this, the lens unit is moved in the first direction when the pitch coil is energized, and the lens unit is moved in the second direction when the yaw coil is energized.

Ninthly, the lens barrel according to the above-mentioned present technology desirably further includes a movable body including the lens unit and a unit holder configured to support the lens unit, in which the lens unit is desirably rotated with respect to the unit holder in the rolling direction, and the unit holder and the lens unit are desirably integrally moved in at least one of the first direction or the second direction.

With this, the lens unit is rotated with respect to the unit holder in the rolling direction to perform image stabilization in the rolling direction, and the lens unit is moved together with the unit holder in the first direction or the second direction to perform image stabilization in the first direction or the second direction.

Tenthly, in the lens barrel according to the above-mentioned present technology, the second coil is desirably mounted on the lens unit.

With this, the weight of the lens unit is reduced as compared to a case where a magnet is mounted on a lens unit, and the lightweight lens unit is pivoted in the rolling direction.

Eleventhly, in the lens barrel according to the above-mentioned present technology, the lens unit is desirably positioned inside the unit holder.

With this, the movable body is operated under the state where the lens unit is positioned inside the unit holder.

Twelfthly, in the lens barrel according to the above-mentioned present technology, the lens unit is desirably rotatably supported by the unit holder through at least a bearing.

With this, the lens unit is supported by the unit holder through the bearing.

Thirteenthly, in the lens barrel according to the above-mentioned present technology, the bearing is desirably formed into a substantially circular shape.

With this, the lens unit is supported by the unit holder through the substantially circular bearing.

Fourteenthly, in the lens barrel according to the above-mentioned present technology, the bearing desirably includes an inner ring that is mounted on the lens unit, the bearing desirably includes an outer ring that is mounted on the unit holder, and the inner ring of the bearing is desirably attracted in an optical axis direction by magnetic force of the second magnet.

With this, the inner ring is displaced to the second magnet side with respect to the outer ring in the bearing, which leads to a state where the spheres of the bearing are always in contact with the inner ring and the outer ring.

Fifteenthly, the lens barrel according to the above-mentioned present technology desirably further includes a sliding bearing positioned so as to be separated from the bearing in an optical axis direction, in which the lens unit is desirably rotatably supported by the unit holder through the bearing and the sliding bearing.

With this, as compared to a case where bearings are used as two rotation assistance means, the placement space of the rotation assistance means being the sliding bearing can be small.

Sixteenthly, in the lens barrel according to the above-mentioned present technology, the bearing and the sliding bearing are desirably positioned at end portions in the optical axis direction of the lens unit.

With this, the lens unit is rotatably supported by the unit holder through the bearing and the sliding bearing mounted at the end portions in the optical axis direction.

Seventeenthly, the lens barrel according to the above-mentioned present technology desirably further includes a roll operation portion including the lens unit, in which the roll operation portion is desirably pivoted in the rolling direction with a fulcrum being an optical axis, and a center of gravity of the roll operation portion is desirably positioned on the optical axis.

With this, the roll operation portion is pivoted in the rolling direction with the pivoting center being the center of gravity.

Eighteenthly, the lens barrel according to the above-mentioned present technology desirably further includes a movable body including the roll operation portion, in which the movable body is desirably moved in at least one of the first direction or the second direction with a fulcrum being a fulcrum axis that crosses the optical axis and is orthogonal to an optical axis direction, and a center of gravity of the movable body is desirably positioned on the fulcrum axis.

With this, the movable body is moved in at least one of the first direction or the second direction with the moving center being the center of gravity.

Nineteenthly, in the lens barrel according to the above-mentioned present technology, the center of gravity of the movable body desirably matches an intersection point between the optical axis and the fulcrum axis.

With this, the movable body is moved in at least one of the first direction or the second direction and pivoted in the first direction with the fulcrum being the optical axis.

Twentiethly, the lens barrel according to the above-mentioned present technology desirably further includes, as the mounting body, a unit holder configured to support the lens unit, in which the lens unit is desirably rotated with respect to the unit holder in the rolling direction, and the unit holder desirably includes a first magnet mounting portion having the first magnet mounted thereon and a second magnet mounting portion having the second magnet mounted thereon.

With this, the first magnet and the second magnet are mounted on the unit holder configured to support the lens unit.

Twenty-firstly, in order to solve the problem described above, according to the present technology, there is provided an imaging apparatus including: an imaging element configured to convert an optical image captured through an optical system into an electrical signal; a lens unit including at least one lens; a first magnet for performing image stabilization in at least one of a first direction or a second direction; a second magnet for performing image stabilization in a rolling direction; a first coil that forms a magnetic circuit together with the first magnet, and moves the lens unit in at least one of the first direction or the second direction; a second coil that forms a magnetic circuit together with the second magnet, and rotates the lens unit in the rolling direction; and a mounting body having the first magnet and the second magnet mounted thereon, in which, when the lens unit is moved in at least one of the first direction or the second direction, the first magnet, the second magnet, and the mounting body are integrally operated.

With this, in the lens barrel, when the lens unit is moved in at least one of the first direction or the second direction, the positional relationship between the first magnet and the second magnet for performing image stabilization is not changed.

Advantageous Effect of Invention

According to the present technology, when the lens unit is moved in at least one of the first direction or the second direction and in the rolling direction, the positional relationship between the first magnet and the second magnet for performing image stabilization is not changed. It is therefore possible to achieve enhancement of the functionality of image stabilization without preventing smooth operation of the movable body.

Note that, the effect described above is not necessarily limited, and may be any effect described in the present disclosure.

DESCRIPTION OF EMBODIMENT

Now, a mode for carrying out a lens barrel and an imaging apparatus of the present technology is described with reference to the attached drawings.

In the embodiment to be described later, the imaging apparatus of the present technology is applied to a video camera, and the lens barrel of the present technology is applied to a lens barrel provided to the video camera.

Note that, the scopes of application of the imaging apparatus and the lens barrel of the present technology are not limited to video cameras and lens barrels provided to the video cameras. The imaging apparatus and the lens barrel of the present technology are widely applicable to, for example, imaging apparatuses built in various types of equipment including still cameras and mobile terminals such as mobile phones other than video cameras, or lens barrels provided to the imaging apparatuses.

Further, the lens barrel of the present technology is applicable to, for example, lens barrels of microscopes, binoculars, and the like, other than lens barrels provided to imaging apparatuses.

In the following description, front-back, vertical, and horizontal directions are indicated in terms of a direction viewed from an image plane side at the time of image capturing with a video camera. Thus, the object side (subject side) is the front side, and the image plane side (photographer side) is the back side.

Note that, the front-back, vertical, and horizontal directions to be described later are directions for convenience of description, and the present technology is implemented without being limited to these directions.

Further, a lens to be described later means both of a lens including a single lens and a lens group including a plurality of lenses.

<Overall Configuration of Imaging Apparatus>

Figure 1:
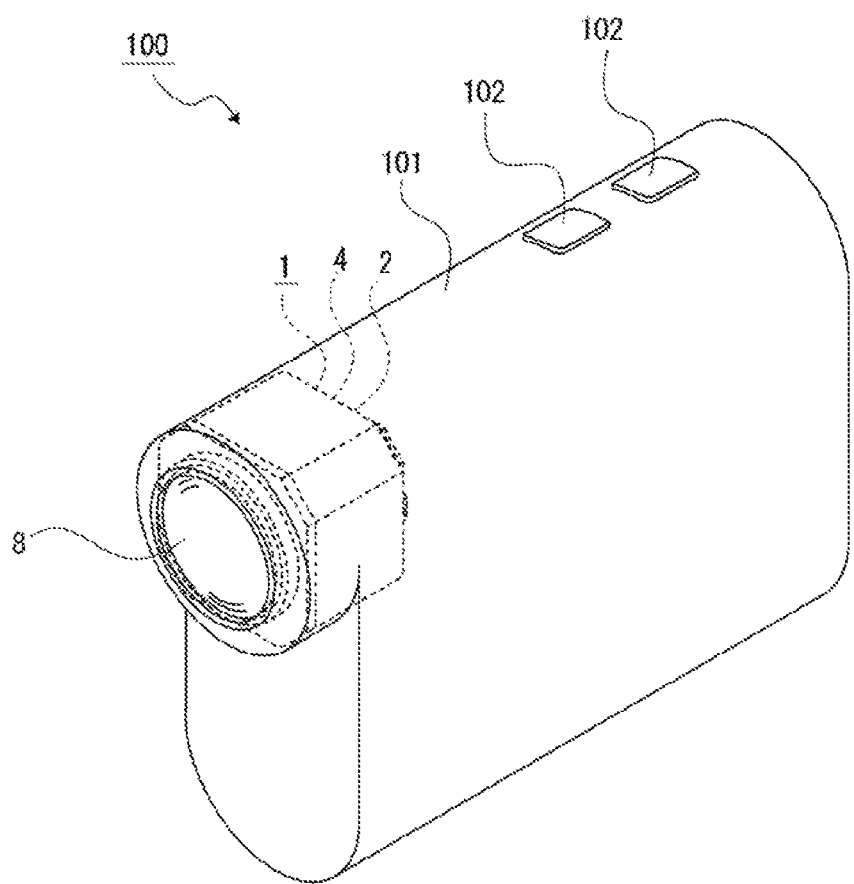
FIG. 1 illustrates a lens barrel and an imaging apparatus according to an embodiment of the present technology together with FIG. 2 to FIG. 22, and is a perspective view of the imaging apparatus.

An imaging apparatus 100 includes an outer casing 101 and a lens barrel 1. The lens barrel 1 is provided inside the outer casing 101. The lens barrel 1 is placed in the upper end portion of the front end portion of the outer casing 101 (see FIG. 1).

The imaging apparatus 100 includes various operation sections 102 arranged on the upper surface or back surface of the outer casing 101, for example. As the operation sections 102, for example, a power supply button, a photographing button, a zoom knob, and a mode switching knob are provided. Further, the imaging apparatus 100 may include a display section (not illustrated) placed on the outer casing 101.

<Configuration of Lens Barrel>

The lens barrel 1 includes a fixed body 2 and a movable body 3 (see FIG. 2 to FIG. 5).

The fixed body 2 includes an outer frame 4, a front group unit 5, and a first coil body 6.

The outer frame 4 is formed into a substantially rectangular cylindrical shape having an axial direction matching the front-back direction, and is fixed to a fixing portion (not illustrated) provided inside the outer casing 101.

The front group unit 5 includes a lens holding member 7 and a first lens group 8. The lens holding member 7 includes a holding portion 7a formed into a cylindrical shape, and a mounted plate portion 7b formed into a substantially rectangular plate shape. The mounted plate portion 7b projects out of the front end portion of the holding portion 7a. The first lens group 8 includes, for example, a plurality of lenses, and is inserted into the holding portion 7a to be held thereby.

The mounted plate portion 7b of the lens holding member 7 is mounted on the front surface of the outer frame 4, and the holding portion 7a of the lens holding member 7 and the first lens group 8 are positioned inside the outer frame 4.

The first coil body 6 includes a coil mounting member 9 and four first coils 10.

The coil mounting member 9 includes a circular base ring 11 having an axial direction matching the front-back direction, four mounting plate portions 12 each protruding forward from the base ring 11, and two fixing protruding portions 13 each protruding forward from the base ring 11.

The mounting plate portions 12 are positioned so as to be separated from each other at even intervals in the circumferential direction. The mounting plate portions 12 are positioned vertically and horizontally, and include the two mounting plate portions 12 vertically facing each other and the two mounting plate portions 12 horizontally facing each other. On the mounting plate portions 12, protruding portions 12a protruding inward are provided.

The fixing protruding portion 13 protrudes from a portion between the mounting plate portions 12 on the base ring 11. The fixing protruding portions 13 are positioned so as to be shifted from each other by 180 degrees with a reference being the center of the base ring 11. The fixing protruding portions 13 each have a plane surface facing outward. The respective plane surfaces are formed as fixing surfaces 13a.

The first coils 10 are mounted on the respective inner surfaces of the mounting plate portions 12 so as to surround the protruding portions 12a. Under the state where the first coil 10 is mounted on the mounting plate portion 12, the protruding portion 12a protrudes inward from the first coil 10. The first coils 10 include vertically positioned pitch coils 10X for performing image stabilization in a first direction, and horizontally positioned yaw coils 10Y for performing image stabilization in a second direction.

The first direction is, for example, a direction around a first fulcrum axis P orthogonal to an optical axis Z (see FIG. 2) of the first lens group 8. The second direction is, for example, a direction around a second fulcrum axis Q orthogonal to both of the optical axis Z and the first fulcrum axis P (see FIG. 6). The first fulcrum axis P is an axis that is orthogonal to the optical axis Z and extends in, for example, a direction connecting the diagonally upward left part and the diagonally downward right part. The second fulcrum axis Q is an axis that is orthogonal to both of the optical axis Z and the first fulcrum axis P and extends in, for example, a direction connecting the diagonally upward right part and the diagonally downward left part.

Note that, the first direction and the second direction may be any directions that are substantially orthogonal to the optical axis Z and substantially orthogonal to each other. The first direction may be a pitching direction that is a direction around a horizontally extended axis, for example, and the second direction may be a yawing direction that is a direction around a vertically extended axis, for example. Alternatively, the first direction may be the up-down direction, for example, and the second direction may be the left-right direction, for example.

The base ring 11 of the coil mounting member 9 is fixed to the inner peripheral surface of the outer frame 4 through adhesion or the like.

Figure 3:
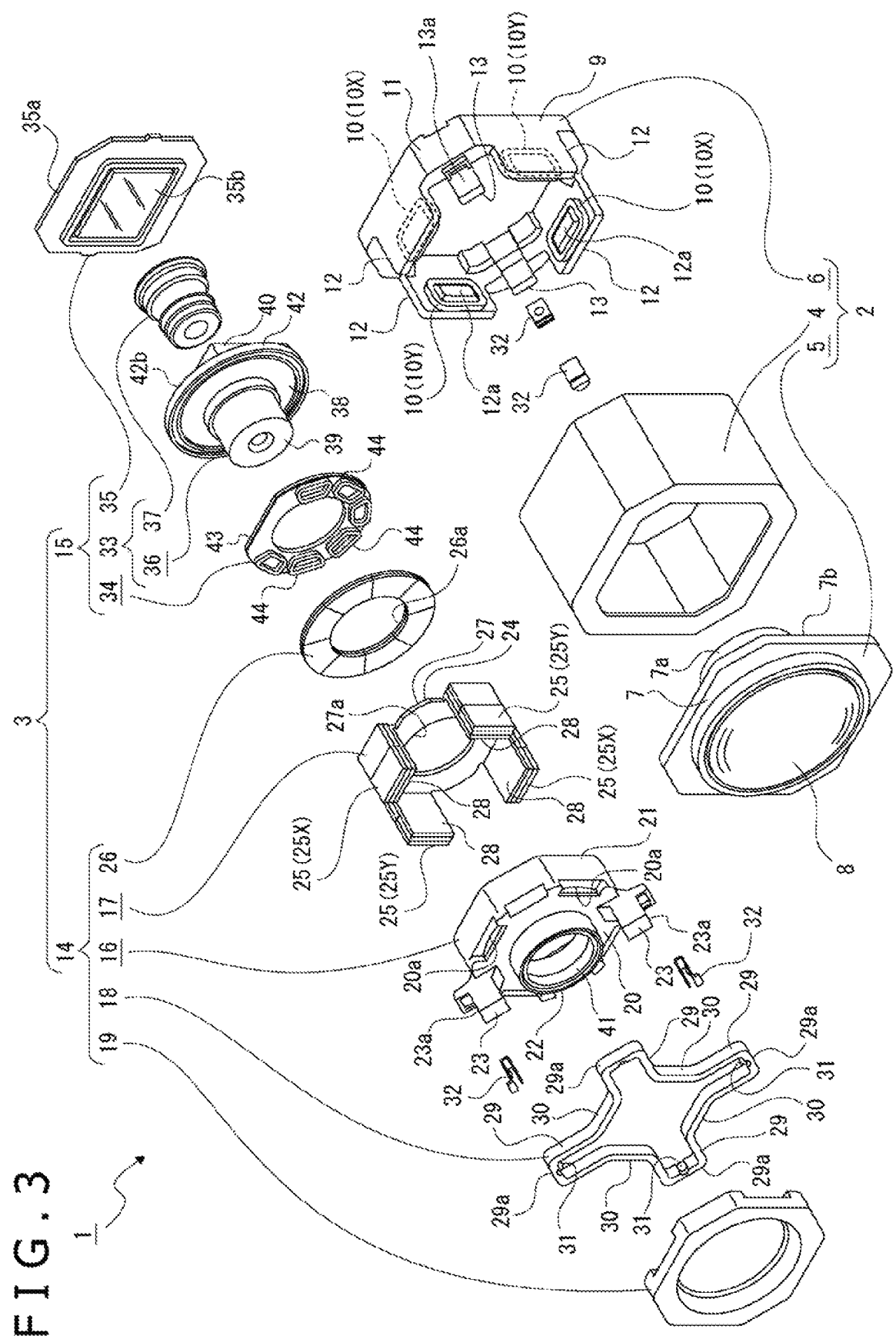
FIG. 3 is an exploded perspective view of the lens barrel.
Figure 4:
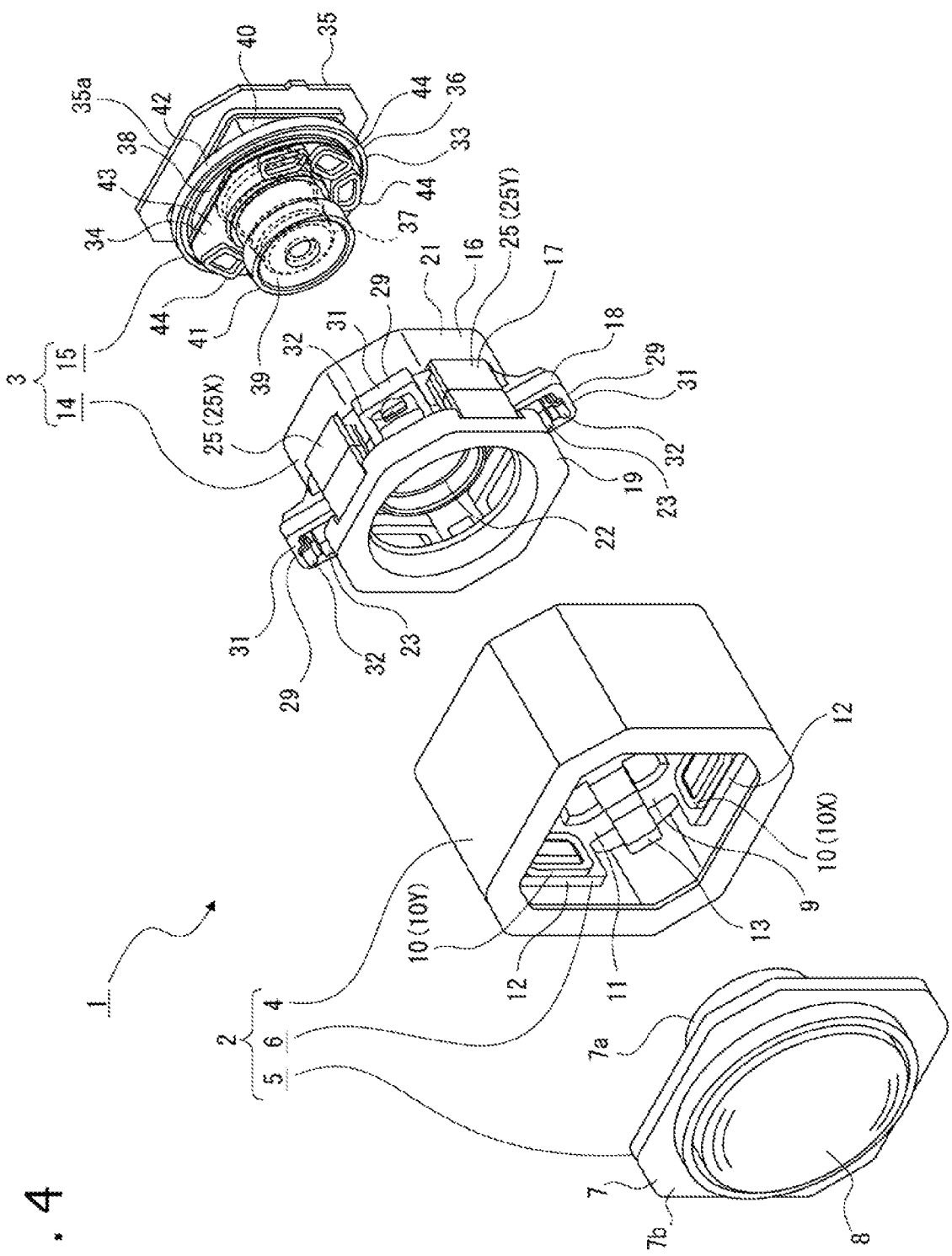
FIG. 4 is an exploded perspective view illustrating the respective parts of the lens barrel in the state of being combined.

The movable body 3 includes a main operation portion 14 and a roll operation portion 15 (see FIG. 3 and FIG. 4). The main operation portion 14 is positioned inside the outer frame 4, and the roll operation portion 15 is positioned inside the outer frame 4 except for its back end portion (see FIG. 5).

Figure 2:
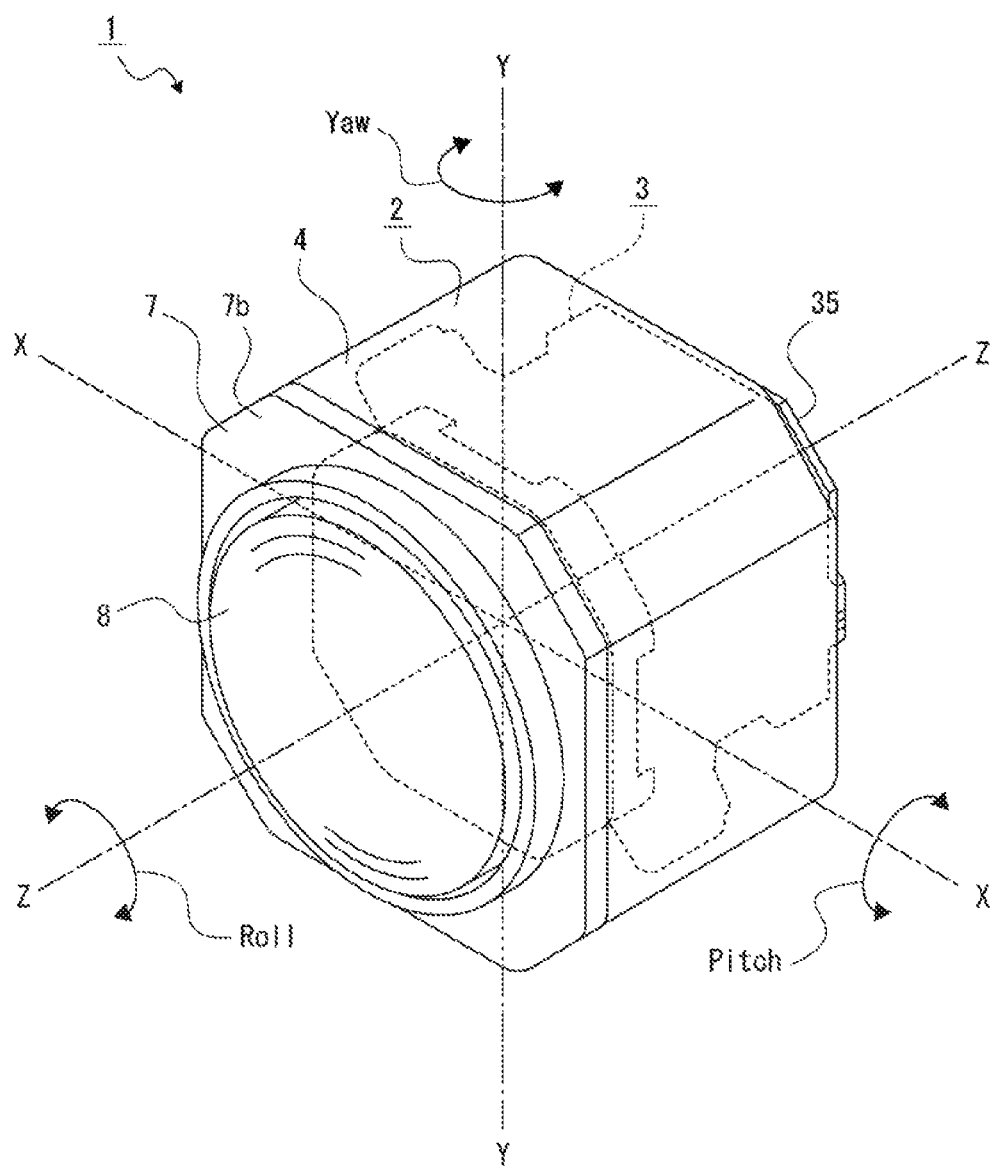
FIG. 2 is a perspective view of the lens barrel.

The main operation portion 14 is movable (pivotable) with respect to the fixed body 2, and the roll operation portion 15 is pivoted with respect to the main operation portion 14 in a rolling direction (Roll illustrated in FIG. 2). The roll operation portion 15 is also operated integrally with the main operation portion 14 in the first direction and the second direction along with the operation of the main operation portion 14.

The rolling direction is a direction that is pivoted with the fulcrum being the optical axis Z (see FIG. 2 and FIG. 6) of the first lens group 8, which extends in the front-back direction.

Figure 5:
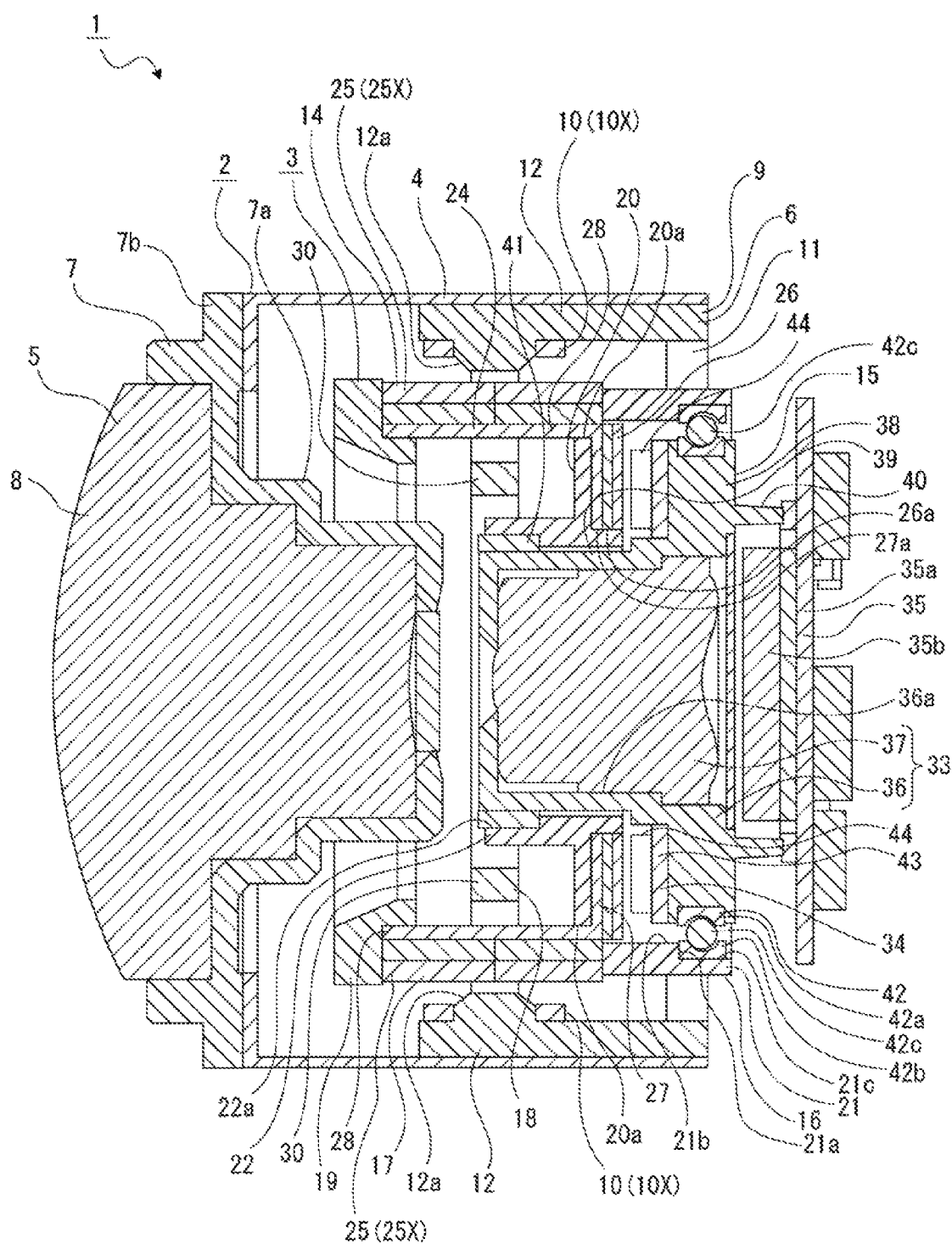
FIG. 5 is a cross-sectional view of the lens barrel.

The main operation portion 14 includes a unit holder 16, a magnet unit 17, a support member 18, and a counterweight 19 (see FIG. 3 to FIG. 5).

Figure 7:
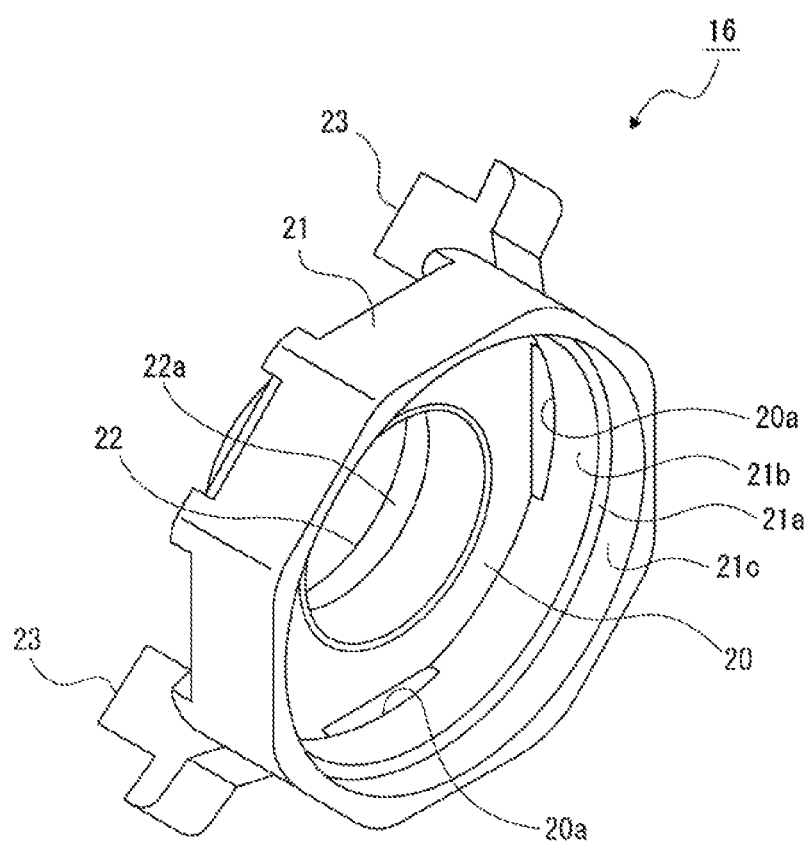
FIG. 7 is an enlarged perspective view of a unit holder.

The unit holder 16 includes, as illustrated in FIG. 3 and FIG. 7, a mounting surface portion 20 formed into a circular plate shape facing the front-back direction, a peripheral surface portion 21 protruding backward from the outer peripheral portion of the mounting surface portion 20, a cylindrical portion 22 protruding forward from the inner peripheral portion of the mounting surface portion 20, and fixing protruding portions 23 each protruding forward from the outer peripheral portion of the mounting surface portion 20.

The mounting surface portion 20 is formed to have a substantially octagonal outline, and has insertion holes 20a formed in its upper, lower, left, and right outer peripheral portions.

The inner peripheral surface of the peripheral surface portion 21 is divided into a first half part and a second half part by a stepped surface 21a facing backward. The first half part is formed as a front-side circumferential surface 21b, and the second half part is formed as a back-side circumferential surface 21c. The diameter of the front-side circumferential surface 21b is slightly smaller than that of the back-side circumferential surface 21c.

The inner peripheral surface of the cylindrical portion 22 is formed as a mounting surface 22a having a circumferential surface in its substantially first half part.

The fixing protruding portions 23 each have a plane surface facing outward in the left-right direction. The respective plane surfaces are formed as fixing surfaces 23a.

The magnet unit 17 includes a yoke 24, first magnets 25, and a second magnet 26 (see FIG. 2 to FIG. 5).

The yoke 24 includes a substantially circular second magnet mounting portion 27 having an axial direction matching the front-back direction, and four first magnet mounting portions 28 each protruding forward from the outer peripheral portion of the second magnet mounting portion 27. The first magnet mounting portions 28 are positioned so as to be separated from each other in the circumferential direction. The yoke 24 includes the second magnet mounting portion 27 and the first magnet mounting portions 28 formed to be orthogonal to each other. Space inside the second magnet mounting portion 27 is formed as an insertion hole 27a. The first magnet mounting portions 28 are vertically and horizontally positioned, and include the two first magnet mounting portions 28 vertically facing each other and the two first magnet mounting portions 28 horizontally facing each other.

The first magnets 25 are formed into a plate shape and mounted on the respective exterior surfaces of the first magnet mounting portions 28. One surface in the thickness direction of each of the first magnets 25 is mounted on the outer-side surface in the thickness direction of each of the first magnet mounting portions 28. The first magnets 25 include vertically positioned pitch magnets 25X for performing image stabilization in the first direction, and horizontally positioned yaw magnets 25Y for performing image stabilization in the second direction.

Figure 6:
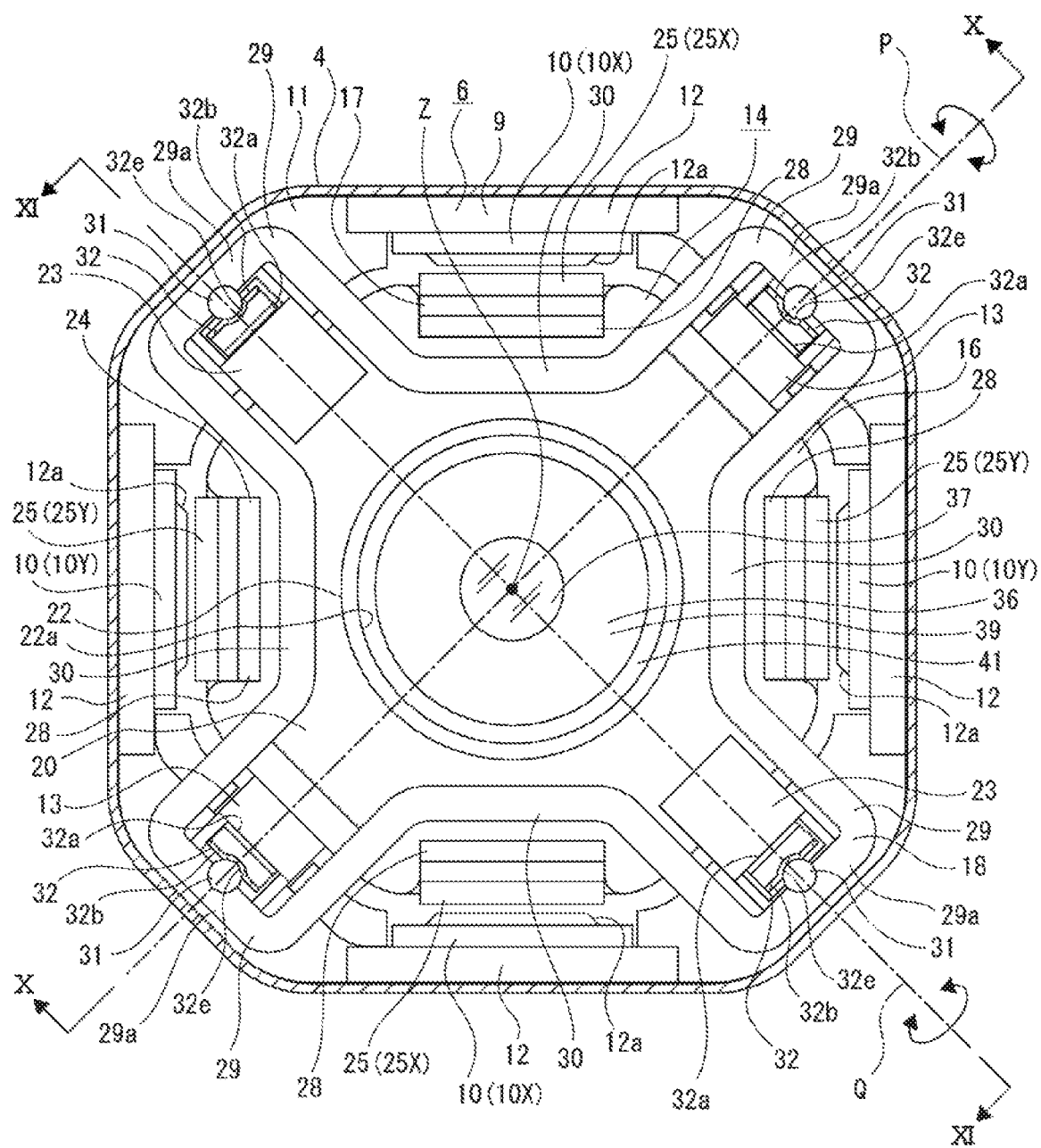
FIG. 6 is a front view illustrating an internal structure including a support member and the like in which some parts are illustrated in section.

The first direction is the direction pivoted with the fulcrum being the first fulcrum axis P (see FIG. 6), and the second direction is the direction pivoted with the fulcrum being the second fulcrum axis Q (see FIG. 6).

The second magnet 26 is formed into a circular plate shape facing the front-back direction. The second magnet 26 is mounted on the back surface of the second magnet mounting portion 27 of the yoke 24. Space inside the second magnet 26 is formed as a through hole 26a.

The first magnet mounting portions 28 of the yoke 24 are inserted into the respective insertion holes 20a of the unit holder 16 from the back side, and the first magnets 25 are mounted on the respective first magnet mounting portions 28. The front surface of the second magnet mounting portion 27 of the yoke 24 is mounted on the back surface of the mounting surface portion 20 of the unit holder 16.

As described above, the first magnets 25 and the second magnet 26 are mounted on the yoke 24, and the yoke 24 functions as a mounting body.

Note that, the unit holder 16 and the yoke 24 may be integrally formed through insert molding, for example, so that the unit holder 16 and the yoke 24 may be provided as a unit holder as a whole. In this case, the unit holder, which is obtained through integral formation, functions as the mounting body, and the first magnet mounting portions and the second magnet mounting portion are provided on the unit holder, which is obtained through integral formation.

Figure 13:
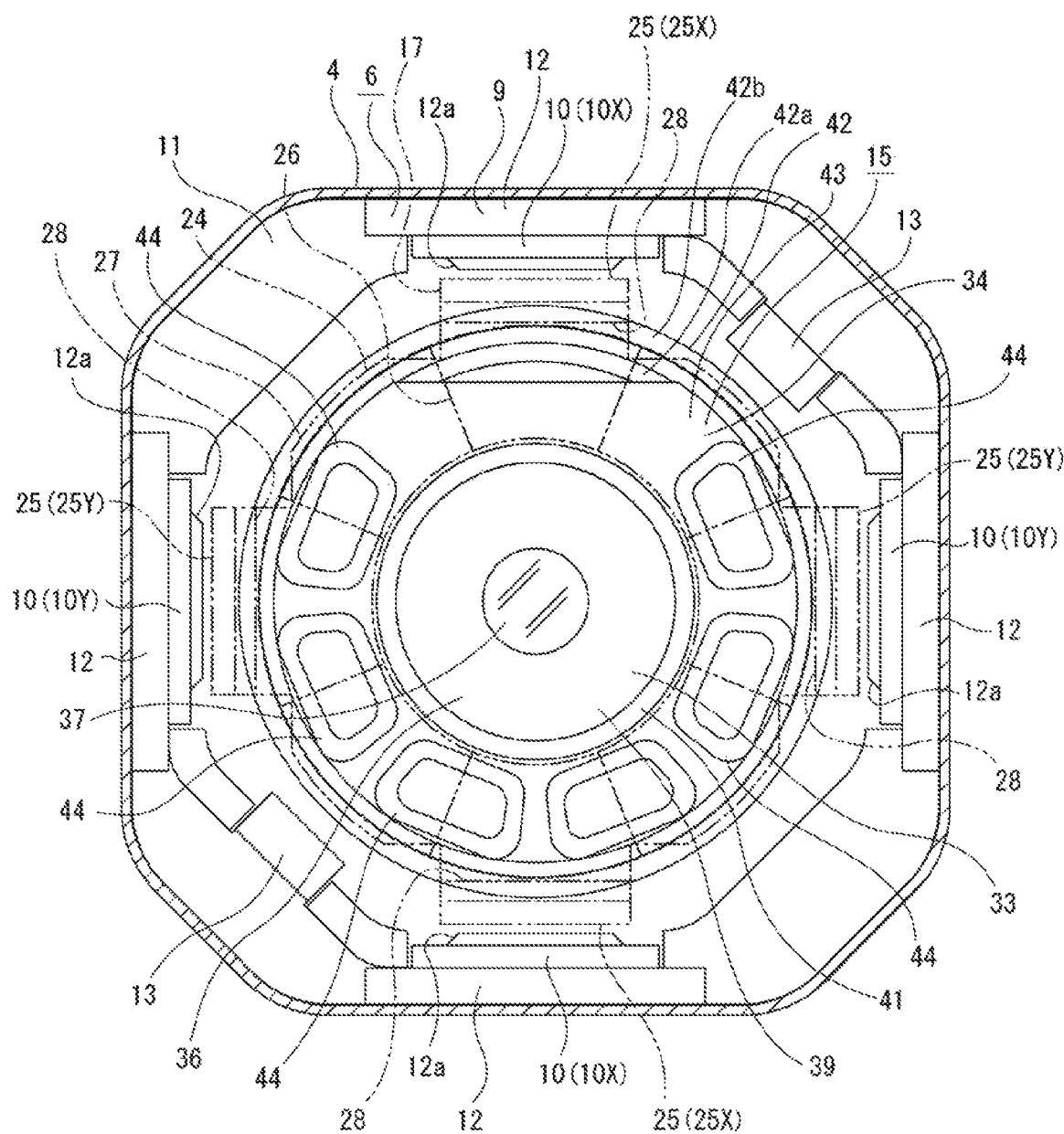
FIG. 13 is a front view illustrating an internal structure including a second coil body and the like in which some parts are illustrated in section.

Under the state where the first magnets 25 are mounted on the respective first magnet mounting portions 28 of the yoke 24, as illustrated in FIG. 13, the pitch magnets 25X are positioned to face the respective pitch coils 10X of the first coil body 6, and the yaw magnets 25Y are positioned to face the respective yaw coils 10Y of the first coil body 6. The pitch magnets 25X and the pitch coils 10X form a first magnetic circuit, and the yaw magnets 25Y and the yaw coils 10Y form a second magnetic circuit.

Figure 8:
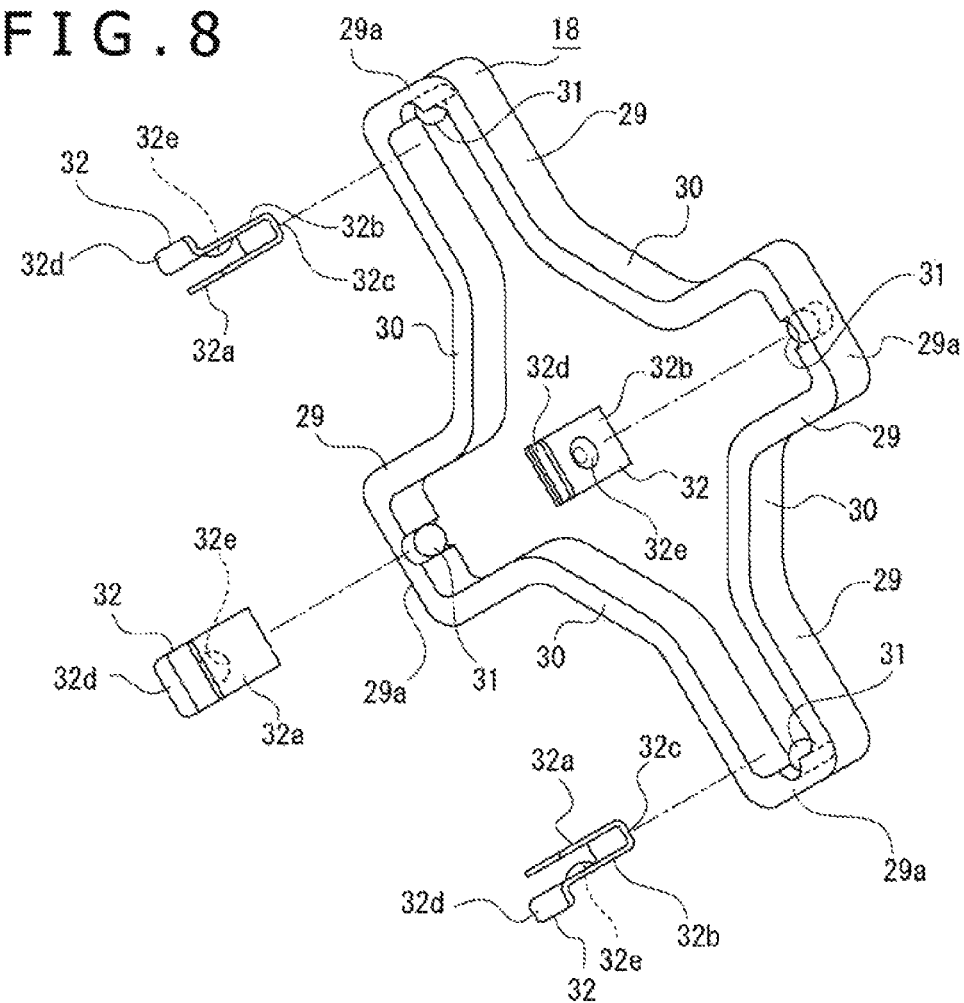
FIG. 8 is an enlarged perspective view of the support member and a spring member.

The support member 18 is formed into a substantially cross shape when viewed from the front-back direction (see FIG. 3 and FIG. 8). The support member 18 includes a U-shaped projecting portions 29 protruding in diagonal directions with respect to the vertical and horizontal directions, and coupling portions 30 for coupling the projecting portions 29 to each other. The distal end portions of the projecting portions 29 are provided as groove forming portions 29a.

On the inner surface side of the groove forming portion 29a, a recessed groove extending in the front-back direction is formed. To the groove forming portion 29a, a spherical support member 31 is fixed while being partly inserted into the recessed groove.

The coupling portions 30 are positioned so as to be vertically and horizontally separated from each other.

Figure 9:
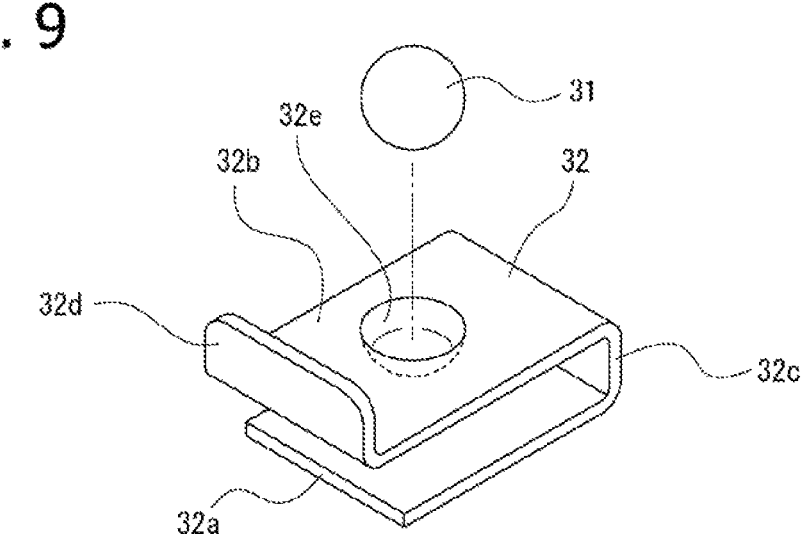
FIG. 9 is an enlarged perspective view of the spring member.

The four spring members 32 are provided corresponding to the projecting portions 29 of the support member 18. The spring member 32 is a leaf spring and formed into a substantially U shape having an opening on the front side (see FIG. 9). The spring member 32 includes an inner-side opposed surface portion 32a and an outer-side opposed surface portion 32b opposing to each other in the thickness direction, a connection surface portion 32c for connecting the respective back end portions of the inner-side opposed surface portion 32a and the outer-side opposed surface portion 32b to each other, and a folded portion 32d protruding outward from the front end portion of the outer-side opposed surface portion 32b. In the outer-side opposed surface portion 32b, a spherical sliding recessed portion 32e facing outward is formed.

Figure 10:
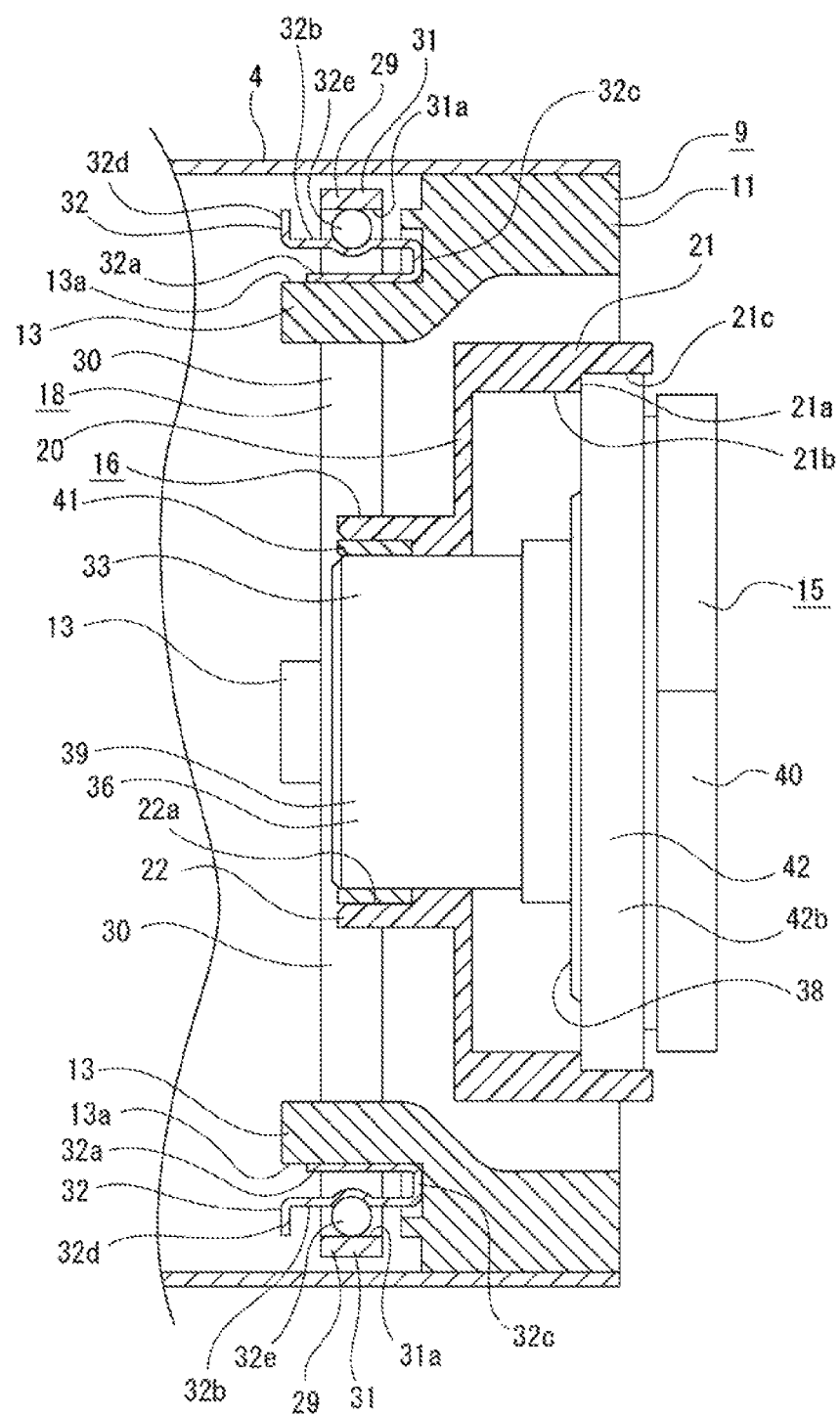
FIG. 10 is a cross-sectional view along the line X-X illustrated in FIG. 6, illustrating a state where the support member is supported by a first coil body through the spring member in which magnets and the like are omitted.
Figure 11:
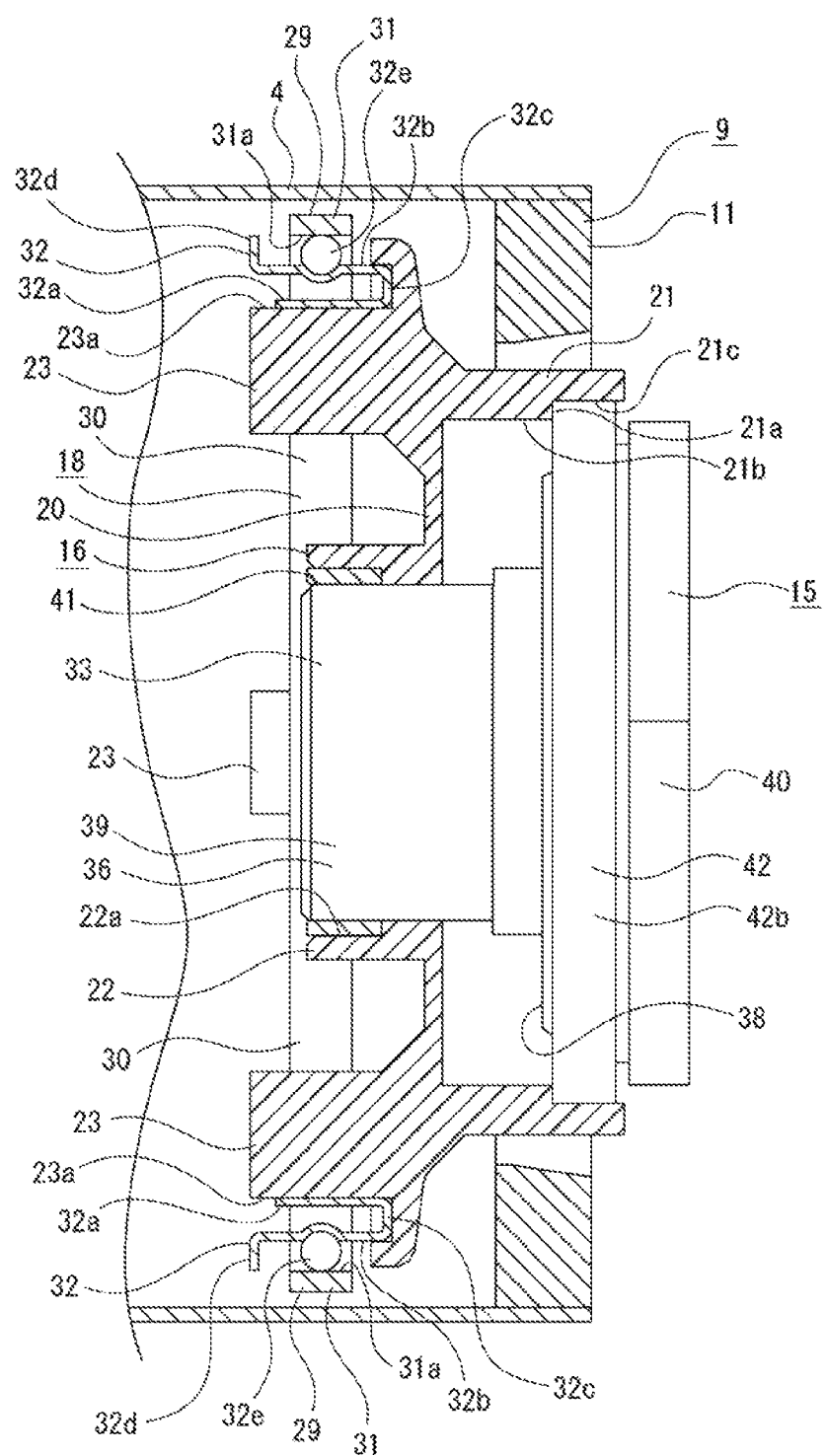
FIG. 11 is a cross-sectional view along the line XI-XI illustrated in FIG. 6, illustrating a state where the unit holder is supported by the support member through the spring member in which the magnets and the like are omitted.

The inner-side opposed surface portions 32a of the spring members 32 are fixed to the respective fixing surfaces 13a of the fixing protruding portions 13 of the first coil body 6 and the respective fixing surfaces 23a of the fixing protruding portions 23 of the unit holder 16 (see FIG. 6, FIG. 10, and FIG. 11).

Under the state where the inner-side opposed surface portions 32a the spring members 32 are fixed to the respective fixing surfaces 13a and 23a, the support member 18 is supported by the spring members 32. Under the state where the support member 18 is supported by the spring members 32, the spherical support bodies 31 fixed to the groove forming portions 29a of the projecting portions 29 are inserted into the respective sliding recessed portions 32e of the spring members 32. The outer-side opposed surface portions 32b are pressed against the respective spherical support bodies 31 by the urging force of the spring members 32. Thus, the spherical support bodies 31, are rotatable (slidable) with respect to the spring members 32.

Since the spherical support bodies 31 are fixed to the support member 18, the support member 18 is pivotable integrally with the spherical support bodies 31 with respect to the spring members 32.

The folded portions 32d of the spring members 32 are positioned in front of the respective groove forming portions 29a of the support member 18 so that the support member 18 is prevented from dropping off the spring members 32.

Under the state where the support member 18 is supported by the spring members 32 through the spherical support bodies 31, the two spring members 32 fixed to the fixing protruding portions 13 of the coil mounting member 9 are fixed to the fixed body 2 since the base ring 11 of the coil mounting member 9 is fixed to the inner peripheral surface of the outer frame 4.

Thus, the unit holder 16 is pivotable with respect to the fixed body 2 in the first direction with the fulcrum being the first fulcrum axis P crossing the optical axis Z (see FIG. 6). The first fulcrum axis P is an axis connecting the two spherical support bodies 31 supported by the two spring members 32 fixed to the fixing protruding portions 13 of the coil mounting member 9. The unit holder 16 is pivotable integrally with the support member 18 with respect to the fixed body 2 in the first direction that is the direction around the first fulcrum axis P.

Further, the unit holder 16 is also pivotable with respect to the support member 18 and the fixed body 2 in the second direction with the fulcrum being the second fulcrum axis Q crossing the optical axis Z. The second fulcrum axis Q is an axis connecting the two spherical support bodies 31 supported by the two spring members 32 fixed to the fixing protruding portions 23 of the support member 18. The unit holder 16 is pivotable with respect to the support member 18 in the second direction that is the direction around the second fulcrum axis Q.

As described above, the unit holder 16 is pivotable with respect to the fixed body 2 in the first direction and the second direction. By being pivoted at predetermined angles in the first direction and the second direction, the unit holder 16 can also be pivoted in the pitching direction that is a direction around a virtual axis X extending in the left-right direction to cross the optical axis Z (see FIG. 2), and the yawing direction that is a direction around a virtual axis Y extending in the up-down direction to cross the optical axis Z (see FIG. 2). Thus, depending on the pivoting angles in the first direction and the second direction, the unit holder 16 is pivotable in directions around any axes that are orthogonal to the optical axis Z and cross the optical axis Z.

The counterweight 19 is formed to have an outline having substantially the same size as the outline of the unit holder 16. Under the state where the magnet unit 17 is mounted on the unit holder 16, the counterweight 19 is fixed to the front surfaces of the first magnet mounting portions 28 of the yoke 24 through adhesion or the like. The counterweight 19 functions to maintain the weight balance of the main operation portion 14 in a predetermined state, and match the center of gravity of the movable body 3, which includes the main operation portion 14 and the roll operation portion 15, with an intersection point between the first fulcrum axis P serving as the pivoting fulcrum in the first direction and the second fulcrum axis Q serving as the pivoting fulcrum in the second direction. The intersection point between the first fulcrum axis P and the second fulcrum axis Q is positioned on the optical axis Z.

In this way, the center of gravity of the movable body 3 matches the intersection point between the first fulcrum axis P and the second fulcrum axis Q, and the intersection point between the first fulcrum axis P and the second fulcrum axis Q is positioned on the optical axis Z. Thus, the center of gravity of the movable body 3 is positioned on the optical axis Z.

The roll operation portion 15 includes a lens unit 33, a second coil body 34, and an element unit 35 (see FIG. 2 to FIG. 5).

Figure 12:
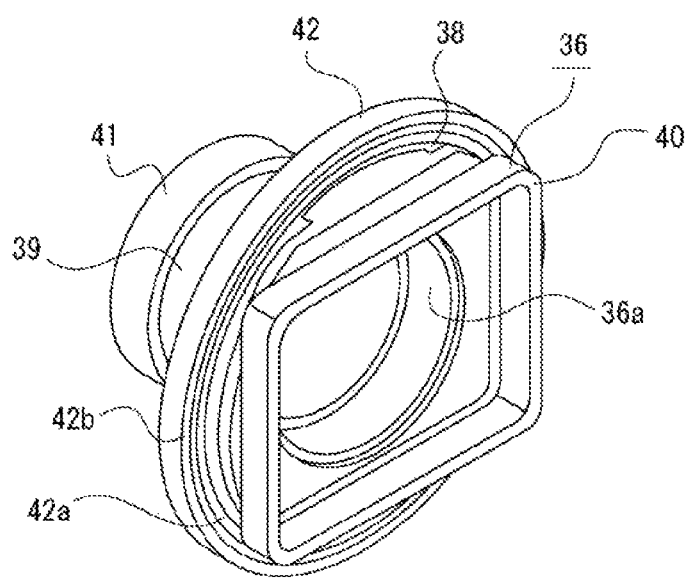
FIG. 12 is an enlarged perspective view of a lens holder.

The lens unit 33 includes a lens holder 36 and a second lens group 37. The lens holder 36 includes a large-diameter portion 38 and a small-diameter portion 39 each formed to have a circular outline. The small-diameter portion 39 protrudes forward from the center-side portion of the large-diameter portion 38 (see FIG. 3 and FIG. 12). On the back surface side of the large-diameter portion 38 of the lens holder 36, an element frame portion 40 is provided. The element frame portion 40 is formed into a rectangular frame shape.

In the lens holder 36, placement space 36*a* connected to space inside the element frame portion 40 is formed.

On the front end portion of the small-diameter portion 39 of the lens holder 36, the sliding bearing 41 is positioned, and the small-diameter portion 36 is rotatable with respect to the sliding bearing 41. The sliding bearing 41 is mounted on the mounting surface 22*a* formed on the cylindrical portion 22 of the unit holder 16, includes a highly slidable metal material, and is formed into a substantially circular shape.

On the outer peripheral surface of the large-diameter portion 38 of the lens holder 36, a bearing 42 is mounted. The bearing 42 includes an inner ring 42*a*, an outer ring 42*b*, and spheres 42*c*. The inner ring 42*a* is fixed to the outer peripheral surface of the large-diameter portion 38 (see FIG. 5). The outer ring 42*b* of the bearing 42 is fixed to the inner peripheral surface of the peripheral surface portion 21 of the unit holder 16. The outer ring 42*b* is fixed to the peripheral surface portion 21 under a state where the outer peripheral surface of the outer ring 42*b* is in contact with the back-side circumferential surface 21*c* and the front surface thereof is in contact with the stepped surface 21*a*.

The second lens group 37 includes, for example, a plurality of lenses, and is held by the lens holder 36 while being placed in the placement space 36*a* (see FIG. 4 and FIG. 5).

The second coil body 34 includes a coil base 43 formed into a substantially circular shape and a plurality of second coils 44 arranged on the front surface of the coil base 43. The coil base 43 includes a magnetic material. The second coils 44 are arranged in the circumferential direction. The coil base 43 of the second coil body 34 is mounted on the front surface of the large-diameter portion 38 of the lens holder 36.

Under the state where the coil base 43 is mounted on the front surface of the large-diameter portion 38, the coil base 43 is positioned inside the outer periphery of the large-diameter portion 38.

The element unit 35 includes a base plate 35*a* and an imaging element 35*b* placed on the front surface of the base plate 35*a*. As the imaging element 35*b*, for example, a CCD (Charge Coupled Device) or a CMOS (Complementary Metal-Oxide Semiconductor) is used.

The element unit 35 is mounted on the lens holder 36 under a state where the imaging element 35*b* is placed inside the element frame portion 40 of the lens holder 36.

The roll operation portion 15 configured as described above is supported by the main operation portion 14 so as to be rotatable in the direction around the optical axis (rolling direction) by being inserted into the unit holder 16 with the small-diameter portion 39 of the lens holder 36 inserted through the through hole 26*a* of the second magnet 26 and the insertion hole 27*a* formed in the second magnet mounting portion 27 of the yoke 24. Under the state where the roll operation portion 15 is supported by the main operation portion 14, the sliding bearing 41 is mounted on the mounting surface 22*a* of the cylindrical portion 22 and the bearing 42 is positioned inside the back end portion of the peripheral surface portion 21. Thus, the roll operation portion 15 is rotatably supported by the unit holder 16 through the sliding bearing 41 and the bearing 42 so that the roll operation portion 15 is smoothly rotatable with respect to the main operation portion 14 in the rolling direction.

Under the state where the roll operation portion 15 is supported by the main operation portion 14, the second magnet 26 is positioned to face the second coils 44 of the second coil body 34 so that the second magnet 26 and the second coils 44 form a third magnetic circuit.

Under the state where the second magnet 26 is positioned to face the second coils 44, the second magnet 26 is positioned inside the outer periphery of the large-diameter portion 38 of the lens holder 36, on which the coil base 43 is mounted.

<Operation of Lens Barrel>

Now, image stabilization operation in the lens barrel 1 is described (see FIG. 14 to FIG. 17).

As described above, the unit holder 16 is pivotable with respect to the outer frame 4 in the first direction and the second direction. The unit holder 16 is pivoted with respect to the outer frame 4 when one or both of the pitch coils 10X, which are positioned to face the pitch magnets 25X, and the yaw coils 10Y, which are positioned to face the yaw magnets 25Y, are energized.

For example, when the pitch coils 10X positioned to face the pitch magnets 25X are energized, in the two first magnetic circuits positioned so as to be vertically separated from each other, thrust is generated in the opposite directions in the optical axis direction.

Further, for example, when the yaw coils 10Y positioned to face the yaw magnets 25Y are energized, in the two second magnetic circuits positioned so as to be horizontally separated from each other, thrust is generated in the opposite directions in the optical axis direction.

Besides, when the pitch coils 10X are energized and the yaw coils 10Y are also energized, thrust is generated in the opposite directions in the optical axis direction in the two first magnetic circuits, and thrust is also generated in the opposite directions in the optical axis direction in the two second magnetic circuits.

Pivoting in the first direction in the lens barrel 1 is performed when the main operation portion 14 is pivoted with respect to the outer frame 4 with the fulcrum being the first fulcrum axis P. Further, pivoting in the second direction in the lens barrel 1 is performed when the unit holder 16, the magnet unit 17, the counterweight 19, and the second magnet 26 of the main operation portion 14 are pivoted with respect to the support member 18 with the fulcrum being the second fulcrum axis Q.

Here, the roll operation portion 15 supported by the unit holder 16 is also pivoted in the first direction or the second direction along with the unit holder 16 and the like, with the result that the second lens group 37 is displaced so that image stabilization is performed.

Figure 14:
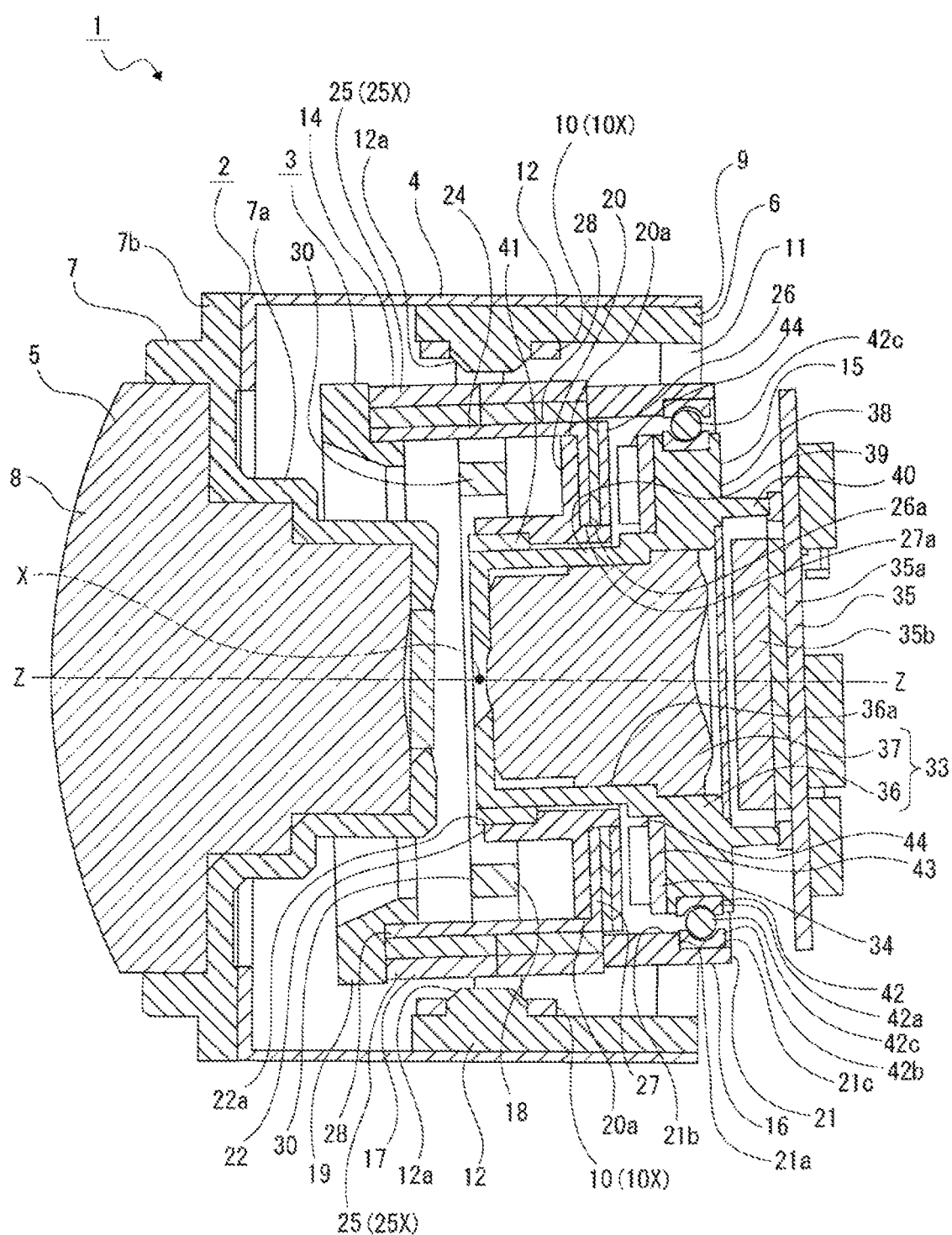
FIG. 14 is a cross-sectional view illustrating a state where a movable body is pivoted with respect to a fixed body in a pitching direction.
Figure 15:
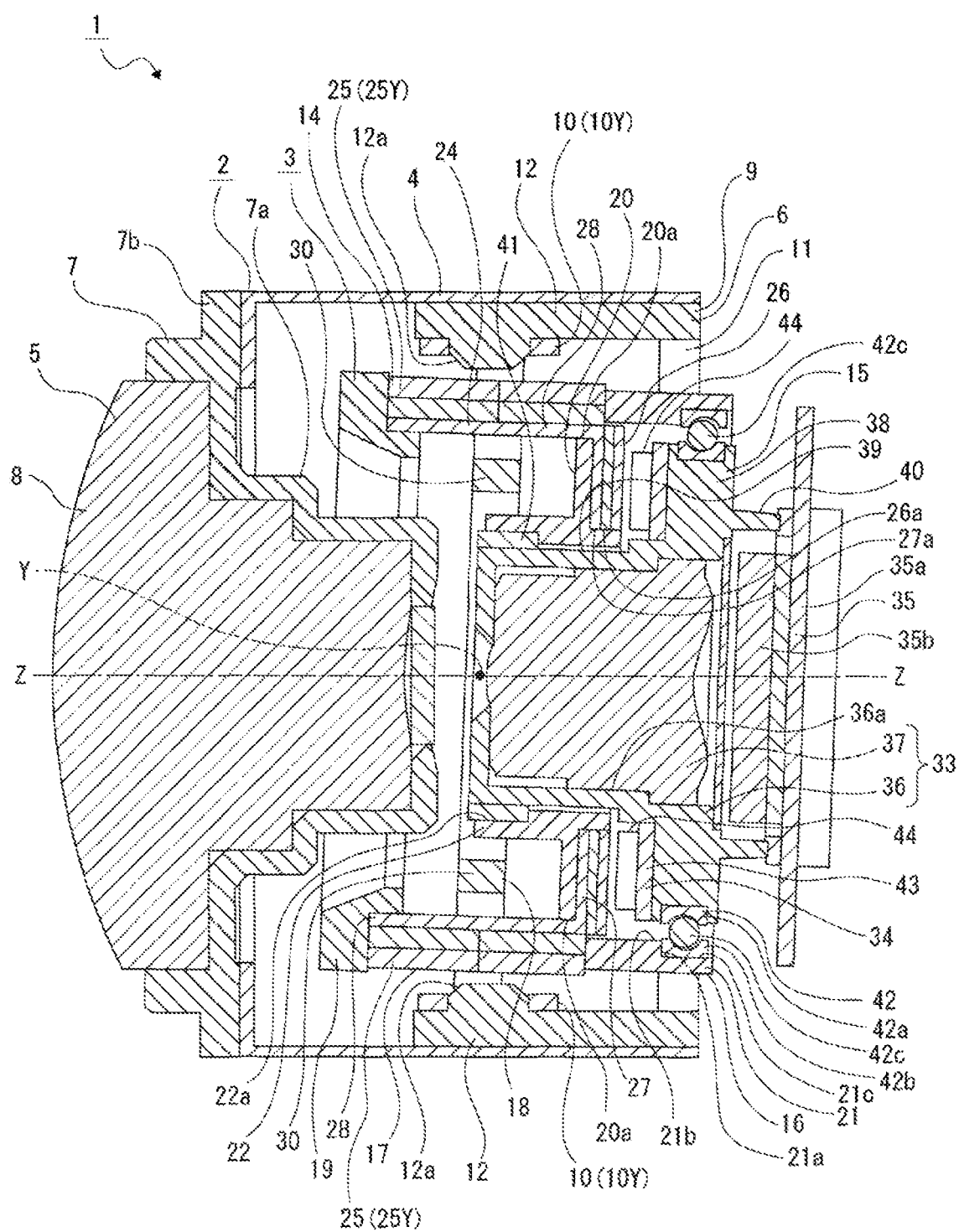
FIG. 15 is a cross-sectional view illustrating a state where the movable body is pivoted with respect to the fixed body in a yawing direction.

The unit holder 16 and the like are pivoted in the first direction and the second direction, thereby being pivoted in the pitching direction (see FIG. 14). Further, the unit holder 16 and the like are pivoted in the first direction and the second direction, thereby being pivoted also in the yawing direction (see FIG. 15).

In this way, in the lens barrel 1, the main operation portion 14 and the roll operation portion 15 are integrally pivoted in the first direction, and the movable body 3 including the main operation portion 14 and the roll operation portion 15 is thus pivoted with respect to the fixed body 2 in the first direction. Since the center of gravity of the movable body 3 is positioned on the first fulcrum axis P, which is the pivoting fulcrum in the first direction, the movable body 3 is pivoted in the first direction with the pivoting center being the center of gravity. Thus, the movable body 3 can be stably pivoted in the first direction.

Further, the center of gravity of the movable body 3 also matches the intersection point between the optical axis Z and the first fulcrum axis P, and the movable body 3 is thus pivoted in the first direction with the fulcrum being the center of the second lens group 37. As a result, enhancement of the correction function of image stabilization in the first direction can be achieved.

Here, the first magnets 25 and the second magnet 26 are each mounted on the yoke 24, and the positional relationship between the first magnets 25 and the second magnet 26 is not changed. The movable body 3 is pivoted in the first direction without a change in positional relationship between the first magnets 25 and the second magnet 26.

Note that, the movable body 3 is pivotable in the first direction to a position at which the peripheral surface portion 21 of the unit holder 16 is in contact with the inner peripheral surface of the coil mounting member 9. With the coil mounting member 9, the movable body 3 is controlled not to be excessively pivoted in the first direction.

Further, in the lens barrel 1, the unit holder 16 and the like of the main operation portion 14 and the roll operation portion 15 are integrally pivoted in the second direction, and the movable body 3 including the unit holder 16 and the like and the roll operation portion 15 is thus pivoted with respect to the fixed body 2 in the second direction. Since the center of gravity of the movable body 3 is positioned on the second fulcrum axis Q, which is the pivoting fulcrum in the second direction, the movable body 3 is pivoted in the second direction with the pivoting center being the center of gravity. Thus, the movable body 3 can be stably pivoted in the second direction.

Further, the center of gravity of the movable body 3 also matches the intersection point between the optical axis Z and the second fulcrum axis Q, and the movable body 3 is thus pivoted in the second direction with the fulcrum being the center of the second lens group 37. As a result, enhancement of the correction function of image stabilization in the second direction can be achieved.

Here, the first magnets 25 and the second magnet 26 are each mounted on the yoke 24, and the positional relationship between the first magnets 25 and the second magnet 26 is not changed. The movable body 3 is pivoted in the second direction without a change in positional relationship between the first magnets 25 and the second magnet 26.

Note that, the movable body 3 is pivotable in the second direction to a position at which the peripheral surface portion 21 of the unit holder 16 is in contact with the inner peripheral surface of the coil mounting member 9. With the coil mounting member 9, the movable body 3 is controlled not to be excessively pivoted in the second direction.

Figure 16:
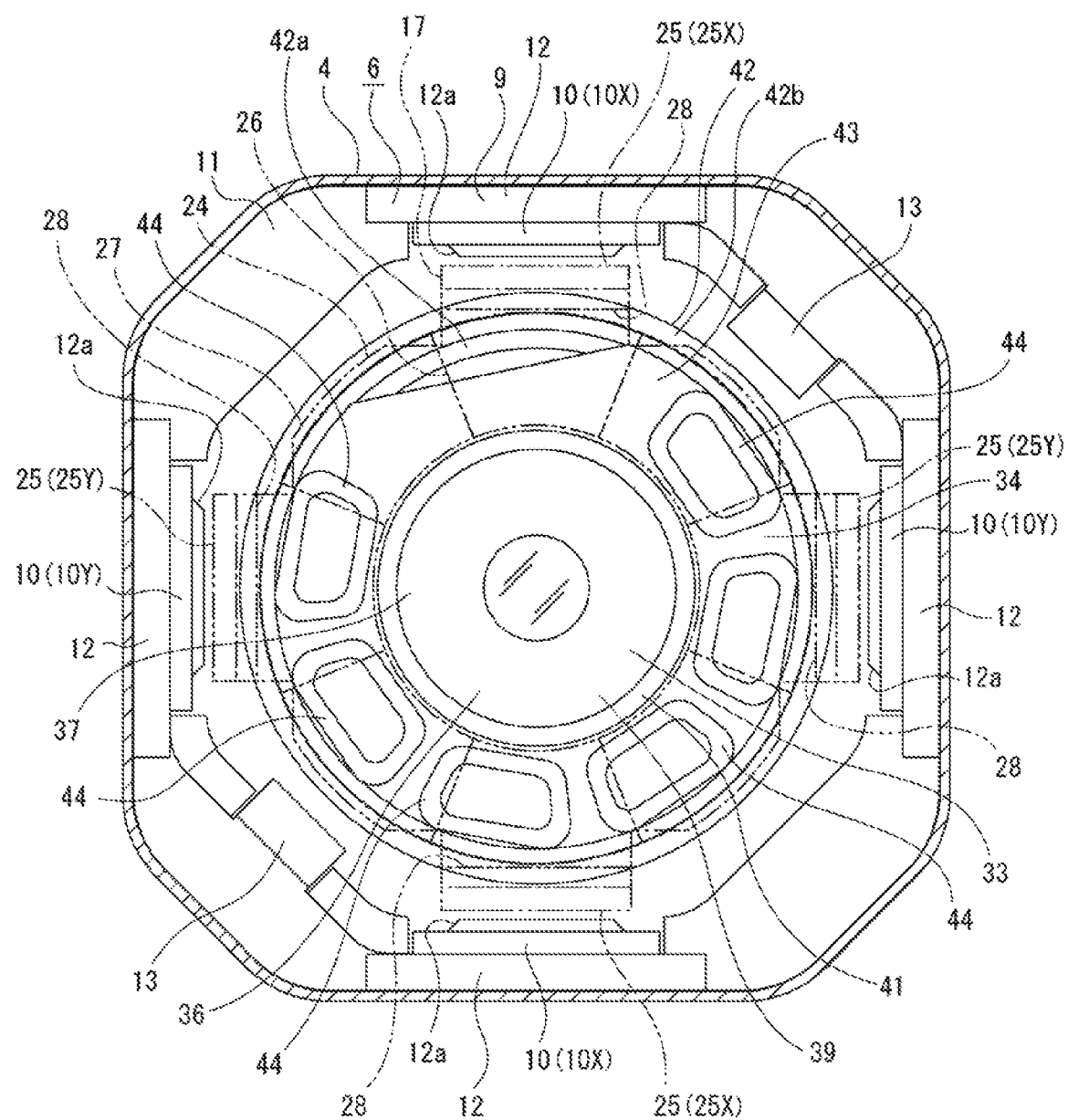
FIG. 16 is a front view illustrating a state where a roll operation portion is pivoted with respect to a main operation portion in a rolling direction.
Figure 17:
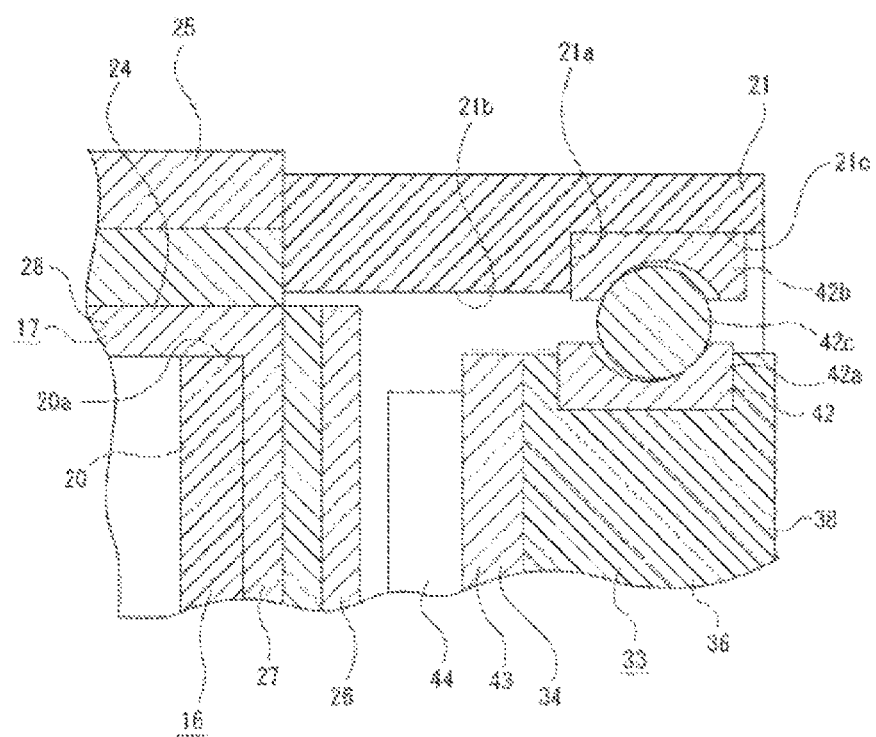
FIG. 17 is an enlarged cross-sectional view illustrating a state where the inner ring of a bearing is attracted to a second magnet.

Meanwhile, when the second coils 44 positioned to face the second magnet 26 are energized, thrust is generated in a direction orthogonal to the optical axis in the third magnetic circuit, and the roll operation portion 15 is pivoted with respect to the main operation portion 14 in the rolling direction with the fulcrum being the optical axis Z (see FIG. 16). With the roll operation portion 15 pivoted with respect to the main operation portion 14 in the rolling direction, the second lens group 37 is displaced so that image stabilization in the rolling direction is performed.

In the lens barrel 1, the center of gravity of the roll operation portion 15 is positioned on the optical axis Z, and the roll operation portion 15 is pivoted in the rolling direction with the pivoting center being the center of gravity. Thus, the roll operation portion 15 can be stably pivoted in the rolling direction.

Here, the first magnets 25 and the second magnet 26 are each mounted on the yoke 24, and the positional relationship between the first magnets 25 and the second magnet 26 is not changed. The roll operation portion 15 is pivoted in the rolling direction without a change in positional relationship between the first magnets 25 and the second magnet 26.

When the roll operation portion 15 is pivoted with respect to the main operation portion 14 in the rolling direction, the roll operation portion 15 is pivoted with respect to the main operation portion 14 through the sliding bearing 41 and the bearing 42. Here, the magnet unit 17 is mounted on the unit holder 16 of the main operation portion 14, and the second magnet 26 is positioned in front of the bearing 42. Since the inner ring 42a of the bearing 42 and the second coil body 34 are mounted on the lens holder 36, and the coil base 43 of the second coil body 34 includes a magnetic material, the coil base 43 is attracted forward by the magnetic force of the second magnet 26. Thus, the inner ring 42a of the bearing 42 is attracted forward with the coil base 43 attracted by the magnetic force of the second magnet 26 (see FIG. 17).

In this way, the inner ring 42a of the bearing 42 is attracted forward with the coil base 43 attracted by the magnetic force of the second magnet 26, and the inner ring 42a is thus displaced forward with respect to the outer ring 42b in the bearing 42, which leads to a state where the spheres 42c are always in contact with the inner ring 42a and the outer ring 42b. The lens unit 33 can thus be smoothly rotated with respect to the unit holder 16.

Further, in the lens barrel 1, the sliding bearing 41 positioned so as to be separated from the bearing 42 in the optical axis direction is provided, and the lens unit 33 is rotatably supported by the unit holder 16 through the bearing 42 and the sliding bearing 41.

Thus, with the sliding bearing 41 being used as one of two rotation assistance means for achieving smooth rotation of the lens unit 33, as compared to a case where the bearings 42 are used as the two rotation assistance means, the placement space of the rotation assistance means being the sliding bearing 41 can be small. As a result, while a reduction in size in the radial direction of the lens barrel 1 is achieved, the lens unit 33 can be smoothly rotated with respect to the unit holder 16.

Besides, the bearing 42 and the sliding bearing 41 are positioned at the end portions in the optical axis direction of the lens unit 33.

Thus, the lens unit 33 is rotatably supported by the unit holder 16 through the bearing 42 and the sliding bearing 41 mounted at the end portions in the optical axis direction, with the result that the lens unit 33 can be rotated more smoothly with respect to the unit holder 16.

<Imaging Apparatus of One Embodiment>

Figure 18:
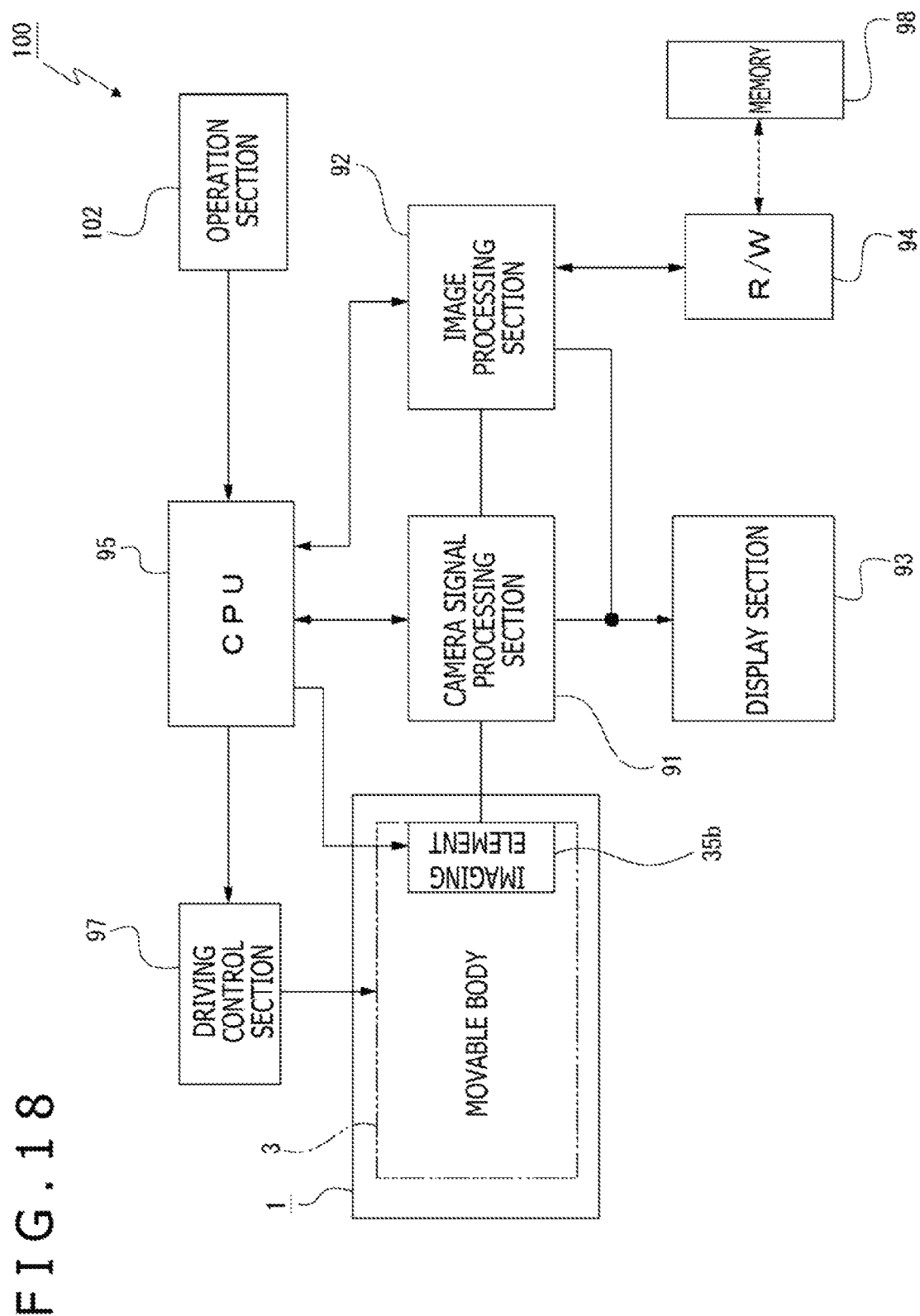
FIG. 18 is a block diagram of the imaging apparatus.

Now, a configuration example of a video camera that is the imaging apparatus according to one embodiment of the present technology is described (see FIG. 18).

The imaging apparatus 100 includes a camera signal processing section 91 configured to perform signal processing on signals of captured images, such as analog-to-digital conversion, and an image processing section 92 configured to perform image signal recording and reproducing processing. Further, the imaging apparatus 100 includes a display section 93 configured to display captured images and the like, an R/W (reader/writer) 94 configured to write/read image signals to/from a memory 98, a CPU (Central Processing Unit) 95 configured to control the entire imaging apparatus 100, the operation section 102 including various switches and the like with which a user performs necessary operation, and a driving control section 97 configured to control the driving of the movable body 3.

Note that, in the imaging apparatus 100, the display section 93 is not necessarily provided, and data on captured images may be sent to another display apparatus so that the images may be displayed.

The camera signal processing section 91 performs various kinds of signal processing on output signals from the imaging element 35b, such as conversion into digital signals, noise removal, image quality correction, and conversion into luminance/color difference signals.

The image processing section 92 performs, for example, image signal compression encoding/decompression decoding processing based on predetermined image data formats, and conversion processing of data specifications such as resolution.

The display section 93 functions to display various kinds of data such as operation status on the operation section 102 by the user, or captured images.

The R/W 94 writes image data encoded by the image processing section 92 to the memory 98, and reads out image data recorded on the memory 98.

The CPU 95 functions as a control processing section configured to control each part of the imaging apparatus 100, and controls each part on the basis of instruction input signals from the operation section 102, for example.

The operation section 102 outputs, to the CPU 95, instruction input signals depending on operation by the user.

The driving control section 97 controls each of the magnetic circuits configured to pivot the movable body 3 or the roll operation portion 15 on the basis of control signals from the CPU 95.

The memory 98 is, for example, a semiconductor memory that is removably inserted into a slot connected to the R/W 94.

Now, the operation of the imaging apparatus 100 is described.

In an image capturing standby state, under control of the CPU 95, a signal of a captured image is output to the display section 93 through the camera signal processing section 91 to be displayed as a camera-through image. Further, when an instruction input signal is input from the operation section 102, the CPU 95 outputs a control signal to the driving control section 97, and the movable body 3 is pivoted on the basis of control of the driving control section 97.

When image capturing operation is performed on the basis of the instruction input signal from the operation section 102, a signal of a captured image is output from the camera signal processing section 91 to the image processing section 92 to be subjected to compression encoding processing, thereby being converted into digital data in a predetermined data format. The data after conversion is output to the R/W 94 and written to the memory 98.

In a case where image data recorded on the memory 98 is reproduced, predetermined image data is read out by the R/W 94 from the memory 98 depending on operation on the operation section 102, to thereby be subjected to decompression decoding processing by the image processing section 92. After that, a reproduced image signal is output to the display section 93 and a reproduced image is thus displayed.

<Conclusion>

As described above, in the lens barrel 1 and the imaging apparatus 100, when the lens unit 33 is moved in at least one of the first direction or the second direction, the first magnets 25 and the second magnet 26 are integrally operated. The movable body 3 is therefore pivoted in the first direction and the second direction without a change in positional relationship between the first magnets 25 and the second magnet 26.

In this way, in the lens barrel 1, when the lens unit 33 is pivoted in the first direction and the second direction, the positional relationship between the first magnets 25 and the second magnet 26 for performing image stabilization is not changed.

This eliminates a risk of, for example, a trouble that may occur in a configuration including a first magnet provided to a main operation portion and a second magnet provided to a roll operation portion, that is, a trouble that the first magnet and the second magnet are attracted by the magnetic force, with the result that the operation positions of the main operation portion and the roll operation portion are shifted from appropriate operation positions.

Thus, enhancement of the functionality of image stabilization can be achieved while smooth operation of the movable body 3 is ensured.

Further, there is provided the yoke 24 including the first magnet mounting portions 28 having the first magnets 25 mounted thereon and the second magnet mounting portion 27 having the second magnet 26 mounted thereon.

Thus, the first magnets 25 and the second magnet 26 are both mounted on the yoke 24, and hence special yokes for mounting the first magnets 25 and the second magnet 26 are not necessary. With this, the number of parts can be reduced and simplification of the structure of the lens barrel 1 can thus be achieved.

Note that, in the case where the unit holder 16 and the yoke 24 are provided as a unit holder as a whole through insert molding or the like, the assembly process of the unit holder 16 and the yoke 24 is eliminated. As a result, enhancement of workability of assembly of the lens barrel 1 can be achieved. In addition, the number of parts can be reduced and simplification of the structure of the lens barrel 1 can thus be achieved.

Further, since the first magnets 25 and the second magnet 26 are mounted on the unit holder configured to support the lens unit 33, enhancement of the functionality of the unit holder can be achieved.

Besides, the magnet unit 17 is positioned under the state where the first magnet mounting portions 28 and the second magnet mounting portion 27 are orthogonal to each other, and hence the first magnet mounting portions 28 and the second magnet mounting portion 27 are positioned so as not to be arranged in the same direction.

Thus, the lens barrel 1 is not increased in size in one direction, for example, the optical axis direction or the direction orthogonal to the optical axis direction, with the result that a reduction in size of the lens barrel 1 can be achieved.

Furthermore, the first magnets 25 and the second magnet 26 are formed into the plate shapes. The first magnets 25 are mounted on the first magnet mounting portions 28 so as to face the direction orthogonal to the optical axis direction. The second magnet 26 is mounted on the second magnet mounting portion 27 so as to face the optical axis direction.

Thus, the first magnets 25 and the second magnet 26 are mounted on the first magnet mounting portions 28 and the second magnet mounting portion 27 in the directions orthogonal to each other. The lens barrel 1 is therefore not increased in size in the direction orthogonal to the optical axis direction and in the optical axis direction, with the result that a further reduction in size of the lens barrel 1 can be achieved.

Further, the plurality of first magnet mounting portions 28 and the plurality of first magnets 25 are provided, and the plurality of first magnet mounting portions 28 is positioned so as to be separated from each other in the direction around the optical axis. The plurality of first magnets 25 is thus positioned so as not to be arranged in the optical axis direction, with the result that a reduction in size in the optical axis direction of the lens barrel 1 can be achieved.

Besides, the second magnet mounting portion 27 and the second magnet 26 are formed into the circular shapes, and the lens unit 33 is partly inserted through the second magnet mounting portion 27 and the second magnet 26.

Thus, the second magnet mounting portion 27 and the second magnet 26 overlap the part of the lens unit 33 in the insertion direction of the lens unit 33, and a reduction in size of the lens barrel 1 can therefore be achieved.

Furthermore, the second magnet 26 and the second coils 44 are positioned inside the outer periphery of the lens unit 33, and hence the second magnet 26 and the second coils 44 do not protrude from the outer periphery of the lens unit 33, with the result that a reduction in size in the direction orthogonal to the optical axis direction of the lens barrel 1 can be achieved.

Further, the lens barrel 1 includes the pitch magnets 25X and the yaw magnets 25Y serving as the first magnets 25, and the pitch coils 10X and the yaw coils 10Y serving as the first coils 10. The lens unit 33 is movable (pivotable) in the first direction and the second direction.

Thus, the lens unit 33 is pivoted in the first direction when the pitch coils 10X are energized, and the lens unit 33 is pivoted in the second direction when the yaw coils 10Y are energized, with the result that enhancement of the functionality of image stabilization in the lens barrel 1 can be achieved.

Note that, in the lens barrel 1, the movable body 3 may be pivoted in the first direction or the second direction.

Further, the lens barrel 1 includes the movable body 3 including the lens unit 33 and the unit holder 16 configured to support the lens unit 33. The lens unit 33 is rotated with respect to the unit holder 16 in the rolling direction, and the unit holder 16 and the lens unit 33 are integrally pivoted in at least one of the first direction or the second direction.

Thus, the lens unit 33 is rotated with respect to the unit holder 16 in the rolling direction to perform image stabilization in the rolling direction, and the lens unit 33 is moved together with the unit holder 16 in the first direction or the second direction to perform image stabilization in the first direction or the second direction. As a result, with the simple structure, enhancement of the functionality of image stabilization of the lens barrel 1 can be achieved.

Besides, the second coils 44 are mounted on the lens unit 33, and the lens unit 33 having the second coils 44 mounted thereon is rotated with respect to the unit holder 16 in the rolling direction.

Thus, the weight of the lens unit 33 is reduced with respect to a case where magnets are mounted on a lens unit. Since the lightweight lens unit 33 is rotated in the rolling direction, the operation speed in the rolling direction can be increased.

Furthermore, the lens unit 33 is positioned inside the unit holder 16. Since the movable body 3 is operated under the state where the lens unit 33 is positioned inside the unit holder 16, the functionality of image stabilization can be enhanced while a reduction in size of the lens barrel 1 is achieved.

Further, the lens unit 33 is rotatably supported by the unit holder 16 through at least the bearing 42. Since the lens unit 33 is supported by the unit holder 16 through the bearing 42, the lens unit 33 can be smoothly rotated with respect to the unit holder 16.

In addition, the bearing 42 is formed into the substantially circular shape. Since the lens unit 33 is supported by the unit holder 16 through the substantially circular bearing 42, the lens unit 33 can be smoothly rotated with respect to the unit holder 16 with the simple configuration.

<Application Example>

The technology according to the present disclosure is applicable to various products. For example, the technology according to the present disclosure may be applied to endoscopic surgery systems.

Figure 19:
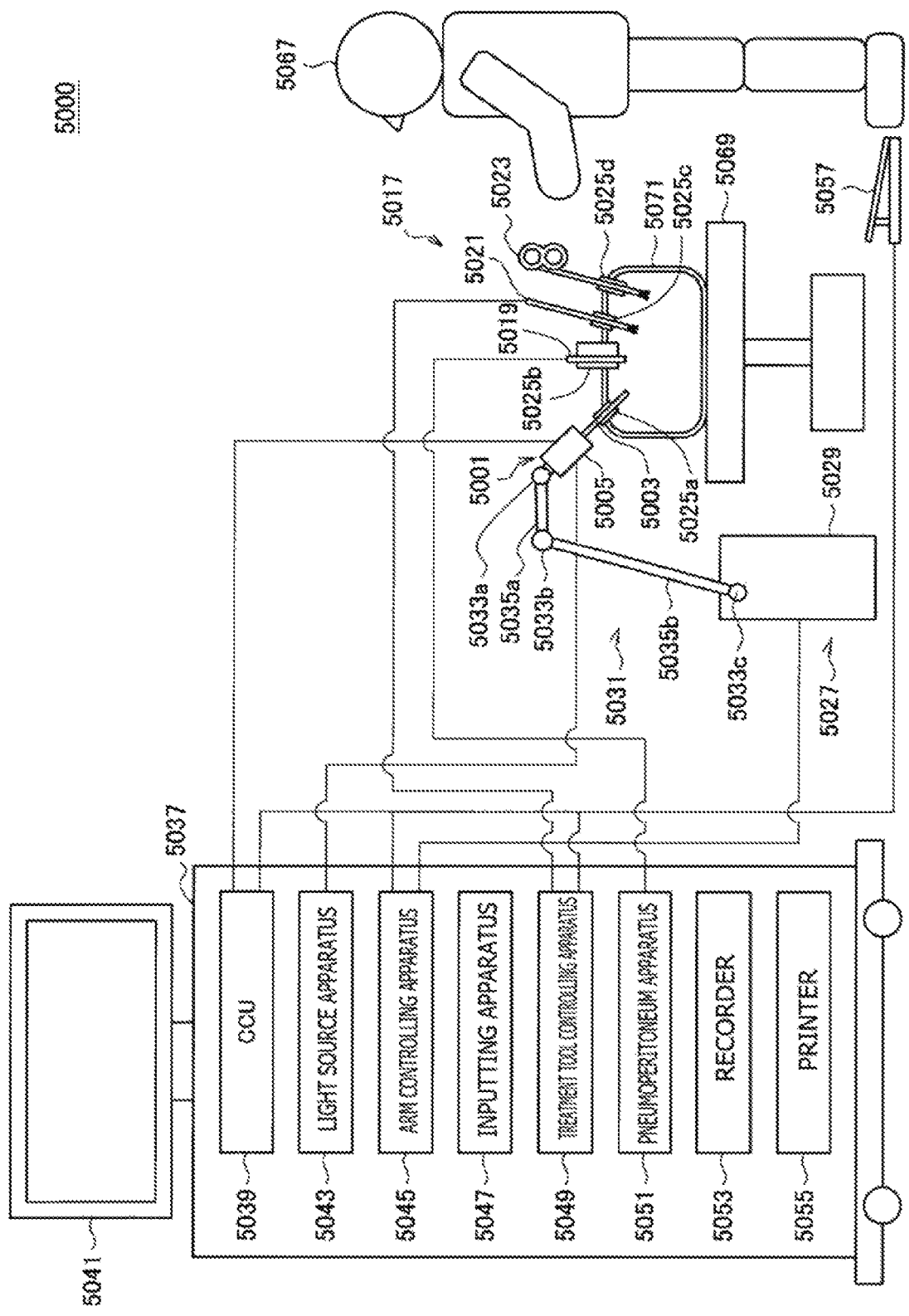
FIG. 19 is a view depicting an example of a schematic configuration of an endoscopic surgery system.

FIG. 19 is a view depicting an example of a schematic configuration of an endoscopic surgery system 5000 to which the technology according to an embodiment of the present disclosure can be applied. In FIG. 19, a state is illustrated in which a surgeon (medical doctor) 5067 is using the endoscopic surgery system 5000 to perform surgery for a patient 5071 on a patient bed 5069. As depicted, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d are used to puncture the abdominal wall. Then, a lens barrel 5003 of the endoscope 5001 and the other surgical tools 5017 are inserted into body cavity of the patient 5071 through the trocars 5025a to 5025d. In the example depicted, as the other surgical tools 5017, a pneumoperitoneum tube 5019, an energy device 5021 and forceps 5023 are inserted into body cavity of the patient 5071. Further, the energy device 5021 is a treatment tool for performing incision and peeling of a tissue, sealing of a blood vessel or the like by high frequency current or ultrasonic vibration. However, the surgical tools 5017 depicted are mere examples at all, and as the surgical tools 5017, various surgical tools which are generally used in endoscopic surgery such as, for example, tweezers or a retractor may be used.

An image of a surgical region in a body cavity of the patient 5071 imaged by the endoscope 5001 is displayed on a display apparatus 5041. The surgeon 5067 would use the energy device 5021 or the forceps 5023 while watching the image of the surgical region displayed on the display apparatus 5041 on the real time basis to perform such treatment as, for example, resection of an affected area. It is to be noted that, though not depicted, the pneumoperitoneum tube 5019, the energy device 5021 and the forceps 5023 are supported by the surgeon 5067, an assistant or the like during surgery.

(Supporting Arm Apparatus)

The supporting arm apparatus 5027 includes an arm unit 5031 extending from a base unit 5029. In the example depicted, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

(Endoscope)

The endoscope 5001 includes the lens barrel 5003 which has a region of a predetermined length from a distal end thereof to be inserted into a body cavity of the patient 5071, and a camera head 5005 connected to a proximal end of the lens barrel 5003. In the example depicted, the endoscope 5001 is depicted as a rigid endoscope having the lens barrel 5003 of the hard type. However, the endoscope 5001 may otherwise be configured as a flexible endoscope having the lens barrel 5003 of the flexible type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body cavity of the patient 5071 through the objective lens. It is to be noted that the endoscope 5001 may be a forward-viewing endoscope or may be an oblique-viewing endoscope or a side-viewing endoscope.

An optical system and an image pickup element are provided in the inside of the camera head 5005 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image pickup elements may be provided on the camera head 5005. In this case, a plurality of relay optical systems are provided in the inside of the lens barrel 5003 in order to guide observation light to each of the plurality of image pickup elements.

(Various Apparatus Incorporated in Cart)

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as, for example, a development process (demosaic process). The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840×vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy device 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy device 5021 for cautery or incision of a tissue, sealing of a blood vessel or the like. A pneumoperitoneum apparatus 5051 feeds gas into a body cavity of the patient 5071 through the pneumoperitoneum tube 5019 to inflate the body cavity in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

(Supporting Arm Apparatus)

The supporting arm apparatus 5027 includes the base unit 5029 serving as a base, and the arm unit 5031 extending from the base unit 5029. In the example depicted, the arm unit 5031 includes the plurality of joint portions 5033a, 5033b and 5033c and the plurality of links 5035a and 5035b connected to each other by the joint portion 5033b. In FIG. 19, for simplified illustration, the configuration of the arm unit 5031 is depicted in a simplified form. Actually, the shape, number and arrangement of the joint portions 5033a to 5033c and the links 5035a and 5035b and the direction and so forth of axes of rotation of the joint portions 5033a to 5033c can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body cavity of the patient 5071.

An actuator is provided in each of the joint portions 5033a to 5033c, and the joint portions 5033a to 5033c are configured such that they are rotatable around predetermined axes of rotation thereof by driving of the respective actuators. The driving of the actuators is controlled by the arm controlling apparatus 5045 to control the rotational angle of each of the joint portions 5033a to 5033c thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endoscope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the operating room.

Further, where force control is applied, the arm controlling apparatus 5045 may perform power-assisted control to drive the actuators of the joint portions 5033a to 5033c such that the arm unit 5031 may receive external force by the user and move smoothly following the external force. This makes it possible to move, when the user directly touches with and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast, where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033a to 5033c of the arm unit 5031 of the supporting arm apparatus 5027 such that the plurality of arm controlling apparatus 5045 cooperate with each other to implement driving control of the arm unit 5031.

(Light Source Apparatus)

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5043. Further, in this case, if laser beams from the respective RGB laser light sources are irradiated time-divisionally on an observation target and driving of the image pickup elements of the camera head 5005 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5043 may be controlled such that the intensity of light to be outputted is changed for each predetermined time. By controlling driving of the image pickup element of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. In special light observation, for example, by utilizing the wavelength dependency of absorption of light in a body tissue to irradiate light of a narrower wavelength band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above.

(Camera Head and CCU)

Figure 20:
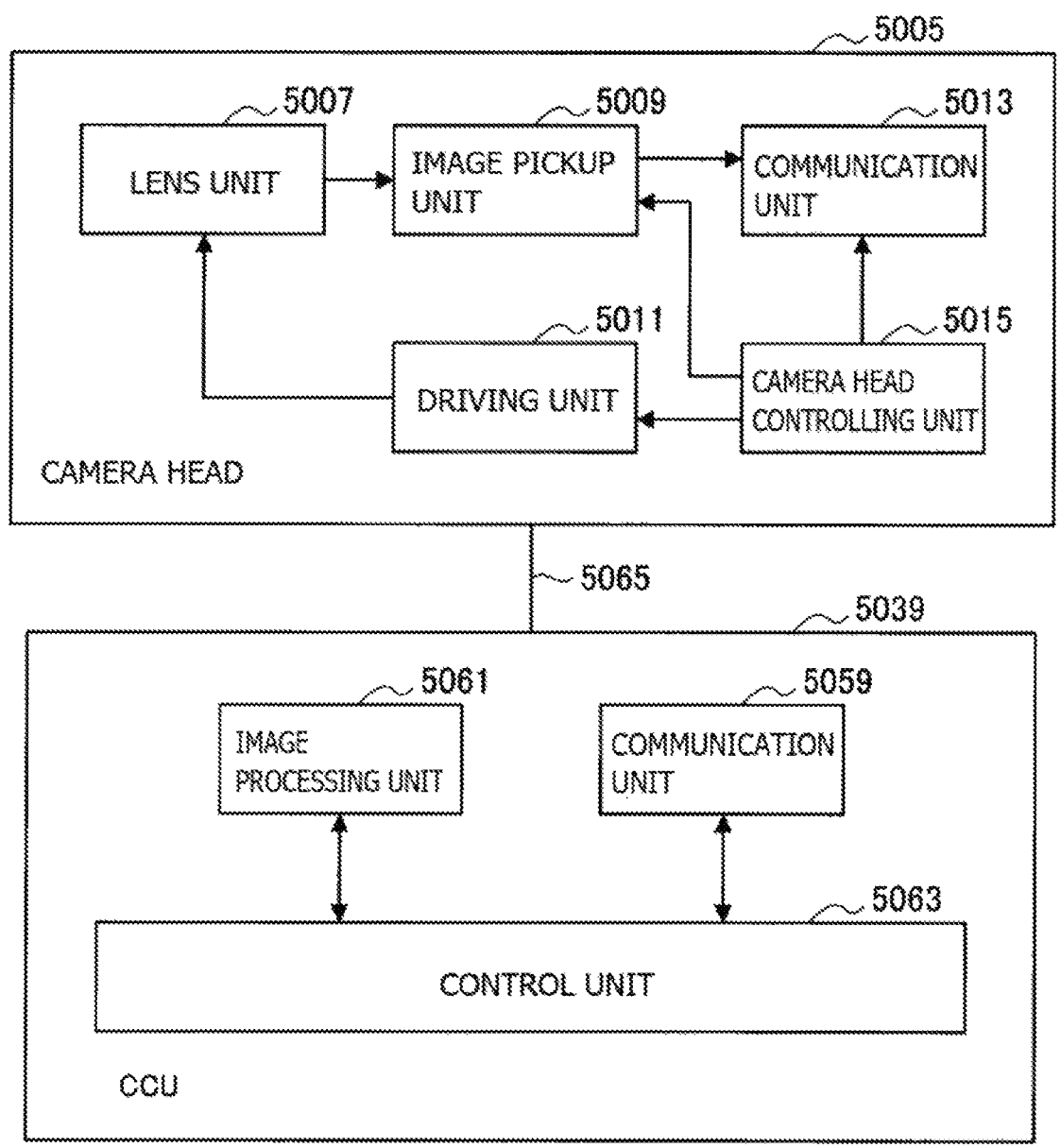
FIG. 20 is a block diagram depicting an example of a functional configuration of a camera head and a camera control unit (CCU) depicted in FIG. 19.

Functions of the camera head 5005 of the endoscope 5001 and the CCU 5039 are described in more detail with reference to FIG. 20. FIG. 20 is a block diagram depicting an example of a functional configuration of the camera head 5005 and the CCU 5039 depicted in FIG. 19.

Referring to FIG. 20, the camera head 5005 has, as functions thereof, a lens unit 5007, an image pickup unit 5009, a driving unit 5011, a communication unit 5013 and a camera head controlling unit 5015. Further, the CCU 5039 has, as functions thereof, a communication unit 5059, an image processing unit 5061 and a control unit 5063. The camera head 5005 and the CCU 5039 are connected to be bidirectionally communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image pickup element of the image pickup unit 5009. Further, the zoom lens and the focusing lens are configured such that the positions thereof on their optical axis are movable for adjustment of the magnification and the focal point of a picked up image.

The image pickup unit 5009 includes an image pickup element and disposed at a succeeding stage to the lens unit 5007. Observation light having passed through the lens unit 5007 is condensed on the light receiving face of the image pickup element, and an image signal corresponding to the observation image is generated by photoelectric conversion of the image pickup element. The image signal generated by the image pickup unit 5009 is provided to the communication unit 5013.

As the image pickup element which is included by the image pickup unit 5009, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image pickup element which is included by the image pickup unit 5009 includes such that it has a pair of image pickup elements for acquiring image signals for the right eye and the left eye compatible with 3D display. Where 3D display is applied, the surgeon 5067 can comprehend the depth of a living body tissue in the surgical region more accurately. It is to be noted that, if the image pickup unit 5009 is configured as that of the multi-plate type, then a plurality of systems of lens units 5007 are provided corresponding to the individual image pickup elements of the image pickup unit 5009.

The image pickup unit 5009 may not necessarily be provided on the camera head 5005. For example, the image pickup unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the image pickup unit 5009 can be adjusted suitably.

The communication unit 5013 includes a communication apparatus for transmitting and receiving various kinds of information to and from the CCU 5039. The communication unit 5013 transmits an image signal acquired from the image pickup unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF) function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image pickup element of the image pickup unit 5009 on the basis of information that a frame rate of a picked up image is designated and/or information that an exposure value upon image picking up is designated. Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the image pickup unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy device 5021 is used and so forth by detecting the shape, color and so forth of edges of the objects included in the surgical region image. The control unit 5063 causes, when it controls the display unit 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fiber ready for optical communication or a composite cable ready for both of electrical and optical communication.

Here, while, in the example depicted, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the operating room. Therefore, such a situation that movement of medical staff in the operating room is disturbed by the transmission cable 5065 can be eliminated.

An example of the endoscopic surgery system 5000 to which the technology according to an embodiment of the present disclosure can be applied has been described above. It is to be noted here that, although the endoscopic surgery system 5000 has been described as an example, the system to which the technology according to an embodiment of the present disclosure can be applied is not limited to the example. For example, the technology according to an embodiment of the present disclosure may be applied to a flexible endoscopic system for inspection or a microscopic surgery system.

The technology according to the present disclosure may be suitably applied to, of the configurations described above, the lens barrel and the imaging apparatus. Specifically, high-definition surgical region images can be obtained, which means that surgery can be performed more safely and more reliably.

The technology according to the present disclosure is applicable to various products. For example, the technology according to the present disclosure may be realized as an apparatus that is mounted on any type of moving bodies including, for example, automobiles, electric cars, hybrid electric cars, motorcycles, bicycles, personal mobilities, airplanes, drones, ships, robots, construction machinery, and agricultural machinery (tractors).

Figure 21:
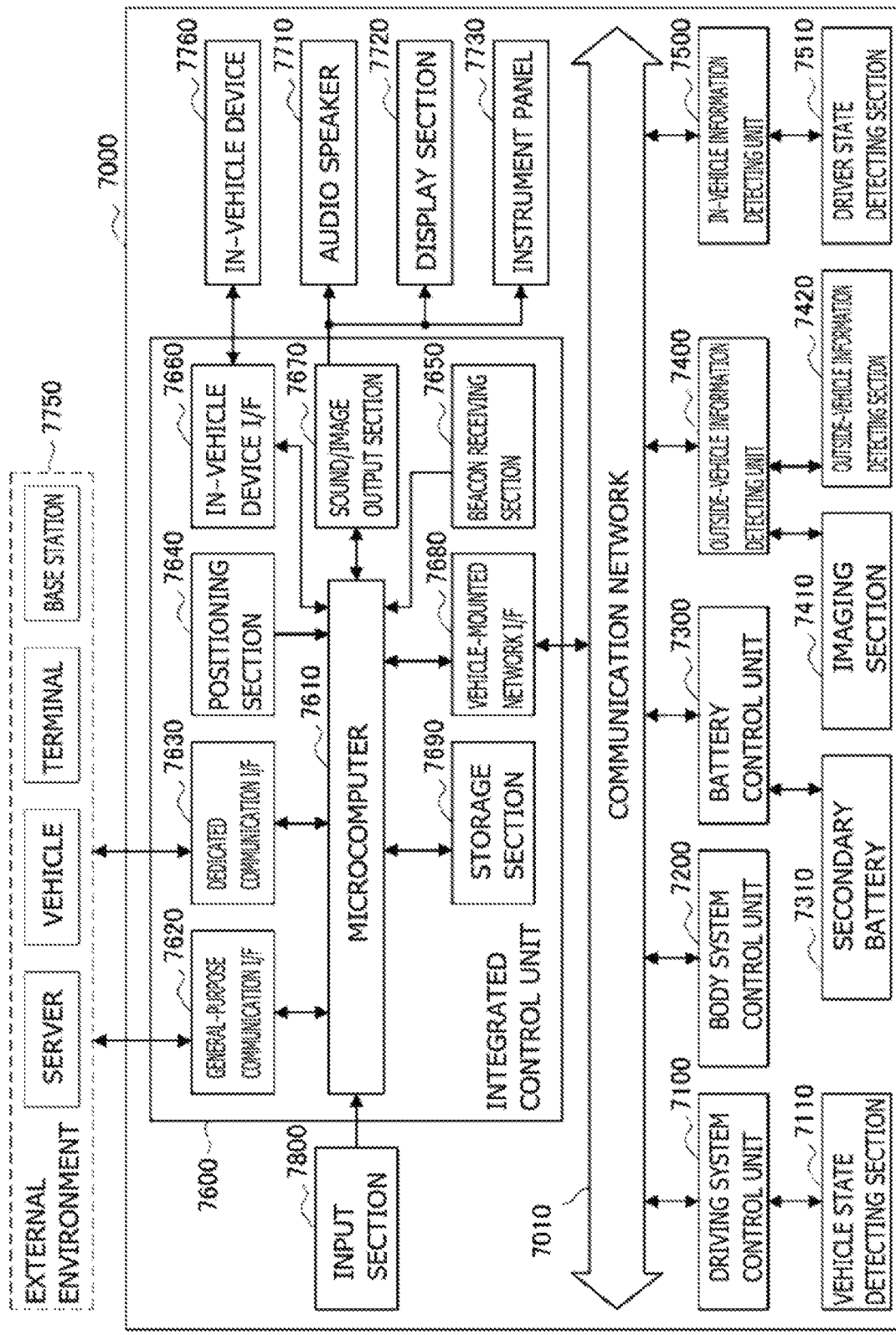
FIG. 21 is a block diagram depicting an example of schematic configuration of a vehicle control system.

FIG. 21 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 21, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 21 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 22:
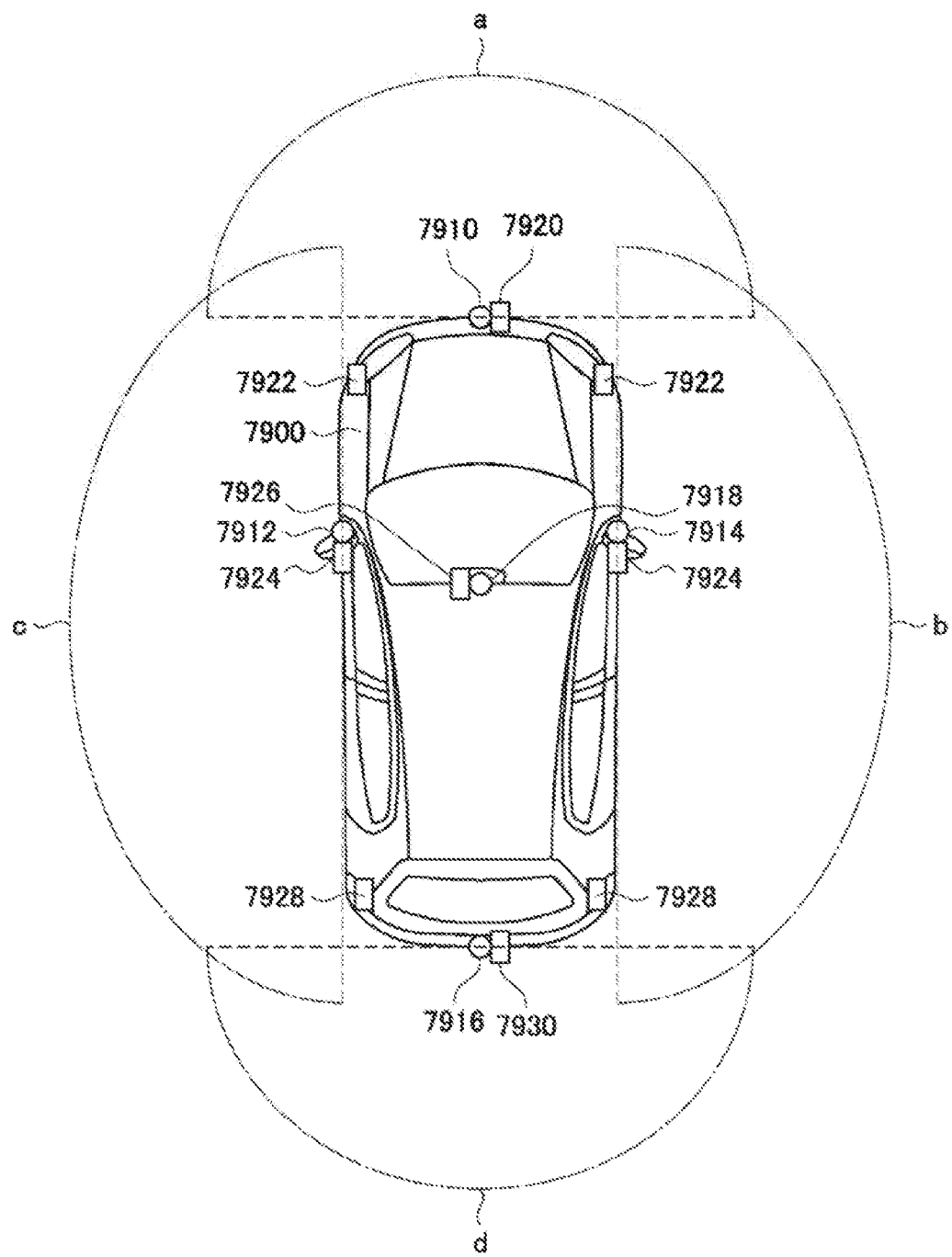
FIG. 22 is a diagram of assistance in explaining an example of installation positions of an outside-vehicle information detecting section and an imaging section.

FIG. 22 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 22 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 21, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 21, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 21 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

<Present Technology>

The present technology can take the following configurations.

(1)

A lens barrel, including:

a lens unit including at least one lens;

a first magnet for performing image stabilization in at least one of a first direction or a second direction;

a second magnet for performing image stabilization in a rolling direction;

a first coil that forms a magnetic circuit together with the first magnet, and moves the lens unit in at least one of the first direction or the second direction;

a second coil that forms a magnetic circuit together with the second magnet, and rotates the lens unit in the rolling direction; and a mounting body having the first magnet and the second magnet mounted thereon, in which when the lens unit is moved in at least one of the first direction or the second direction, the first magnet, the second magnet, and the mounting body are integrally operated.

(2)

The lens barrel according to Item (1), further including:

a yoke including a first magnet mounting portion having the first magnet mounted thereon and a second magnet mounting portion having the second magnet mounted thereon.

(3)

The lens barrel according to Item (2), in which the first magnet mounting portion and the second magnet mounting portion are positioned so as to be orthogonal to each other.

(4)

The lens barrel according to Item (3), in which the first magnet and the second magnet are each formed into a plate shape, the first magnet is mounted on the first magnet mounting portion so as to face a direction orthogonal to an optical axis direction, and the second magnet is mounted on the second magnet mounting portion so as to face the optical axis direction.

(5)

The lens barrel according to any one of Items (2) to (4), in which a plurality of the first magnet mounting portions and a plurality of the first magnets are provided, and the plurality of first magnet mounting portions is positioned so as to be separated from each other in a direction around an optical axis.

(6)

The lens barrel according to any one of Items (2) to (5), in which the second magnet mounting portion and the second magnet are each formed into a circular shape, and the lens unit is partly inserted through the second magnet mounting portion and the second magnet.

(7)

The lens barrel according to any one of Items (1) to (6), in which the second magnet and the second coil are positioned inside an outer periphery of the lens unit.

(8)

The lens barrel according to any one of Items (1) to (7), further including:

a pitch magnet and a yaw magnet serving as the first magnet; and a pitch coil and a yaw coil serving as the first coil, in which the lens unit is movable in the first direction and the second direction.

(9)

The lens barrel according to any one of Items (1) to (8), further including:

a movable body including the lens unit and a unit holder configured to support the lens unit, in which the lens unit is rotated with respect to the unit holder in the rolling direction, and the unit holder and the lens unit are integrally moved in at least one of the first direction or the second direction.

(10)

The lens barrel according to Item (9), in which the second coil is mounted on the lens unit.

(11)
The lens barrel according to Item (9) or (10), in which the lens unit is positioned inside the unit holder.
(12)
The lens barrel according to Item (11), in which the lens unit is rotatably supported by the unit holder through at least a bearing.
(13)
The lens barrel according to Item (12), in which the bearing is formed into a substantially circular shape.
(14)
The lens barrel according to Item (12) or (13), in which the bearing includes an inner ring that is mounted on the lens unit,
the bearing includes an outer ring that is mounted on the unit holder, and
the inner ring of the bearing is attracted in an optical axis direction by magnetic force of the second magnet.
(15)
The lens barrel according to any one of Items (12) to (14), further including:
a sliding bearing positioned so as to be separated from the bearing in an optical axis direction, in which
the lens unit is rotatably supported by the unit holder through the bearing and the sliding bearing.
(16)
The lens barrel according to Item (15), in which the bearing and the sliding bearing are positioned at end portions in the optical axis direction of the lens unit.
(17)
The lens barrel according to any one of Items (1) to (16), further including:
a roll operation portion including the lens unit, in which the roll operation portion is pivoted in the rolling direction with a fulcrum being an optical axis, and
a center of gravity of the roll operation portion is positioned on the optical axis.
(18)
The lens barrel according to Item (17), further including:
a movable body including the roll operation portion, in which
the movable body is moved in at least one of the first direction or the second direction with a fulcrum being a fulcrum axis that crosses the optical axis and is orthogonal to an optical axis direction, and
a center of gravity of the movable body is positioned on the fulcrum axis.
(19)
The lens barrel according to Item (18), in which the center of gravity of the movable body matches an intersection point between the optical axis and the fulcrum axis.
(20)
The lens barrel according to Item (1), further including:
as the mounting body, a unit holder configured to support the lens unit, in which
the lens unit is rotated with respect to the unit holder in the rolling direction, and
the unit holder includes a first magnet mounting portion having the first magnet mounted thereon and a second magnet mounting portion having the second magnet mounted thereon.
(21)
An imaging apparatus, including:
an imaging element configured to convert an optical image captured through an optical system into an electrical signal;
a lens unit including at least one lens;
a first magnet for performing image stabilization in at least one of a first direction or a second direction;
a second magnet for performing image stabilization in a rolling direction;
a first coil that forms a magnetic circuit together with the first magnet, and moves the lens unit in at least one of the first direction or the second direction;
a second coil that forms a magnetic circuit together with the second magnet, and rotates the lens unit in the rolling direction; and
a mounting body having the first magnet and the second magnet mounted thereon, in which
when the lens unit is moved in at least one of the first direction or the second direction, the first magnet, the second magnet, and the mounting body are integrally operated.

REFERENCE SIGNS LIST

100 . . . Imaging apparatus, 1 . . . Lens barrel, 3 . . . Movable body, 10 . . . First coil, 10X . . . Pitch coil, 10Y . . . Yaw coil, 15 . . . Roll operation portion, 16 . . . Unit holder, 24 . . . Yoke, 25 . . . First magnet, 25X . . . Pitch magnet, 25Y . . . Yaw magnet, 26 . . . Second magnet, 27 . . . Second magnet mounting portion, 28 . . . First magnet mounting portion, 33 . . . Lens unit, 35b . . . Imaging element, 36 . . . Lens holder, 41 . . . Sliding bearing, 42 . . . Bearing, 44 . . . Second coil

The invention claimed is:
1. A lens barrel, comprising:
a lens unit that includes at least one lens;
a first magnet configured to execute image stabilization in at least one of a first direction or a second direction;
a second magnet configured to execute image stabilization in a rolling direction;
a first magnetic circuit that includes a first coil and the first magnet, wherein the first coil is configured to move the lens unit in at least one of the first direction or the second direction;
an additional magnetic circuit that includes a second coil and the second magnet, wherein the second coil is configured to rotate the lens unit in the rolling direction; and
a mounting body that includes a yoke, wherein the yoke includes:
a first magnet mounting portion, wherein the first magnet is on the first magnet mounting portion; and
a second magnet mounting portion orthogonal to the first magnet mounting portion,
the second magnet is on the second magnet mounting portion,
the first magnet mounting portion is closer to the lens unit than the first coil, and
in a case where the lens unit is moved in at least one of the first direction or the second direction, the first magnet, the second magnet, and the mounting body are moved.
2. The lens barrel according to claim 1, wherein
the first magnet and the second magnet each has a plate shape,
the first magnet is mountable on the first magnet mounting portion so as to face a direction orthogonal to an optical axis direction, and
the second magnet is mountable on the second magnet mounting portion so as to face the optical axis direction.

3. The lens barrel according to claim 1, further comprising:
   a plurality of first magnet mounting portions that includes the first magnet mounting portion; and
   a plurality of first magnets that includes the first magnet are provided, wherein
      the first magnet mounting portions of the plurality of first magnet mounting portions are spaced apart in a direction around an optical axis.

4. The lens barrel according to claim 1, wherein
   the second magnet mounting portion and the second magnet each has a circular shape, and
   the lens unit is partly inside the second magnet mounting portion and the second magnet.

5. The lens barrel according to claim 1, wherein the second magnet and the second coil are inside an outer periphery of the lens unit.

6. The lens barrel according to claim 1, further comprising:
   a pitch magnet and a yaw magnet serving as the first magnet; and
   a pitch coil and a yaw coil serving as the first coil, wherein the lens unit is movable in the first direction and the second direction.

7. The lens barrel according to claim 1, further comprising a movable body that includes:
   the lens unit; and
   a unit holder configured to support the lens unit, wherein
      the lens unit is configured to rotate with respect to the unit holder in the rolling direction, and
      the unit holder and the lens unit are configured to integrally move in at least one of the first direction or the second direction.

8. The lens barrel according to claim 7, wherein the second coil is mountable on the lens unit.

9. The lens barrel according to claim 7, wherein the lens unit is inside the unit holder.

10. The lens barrel according to claim 9, wherein the lens unit is rotatably supported by the unit holder and at least a bearing.

11. The lens barrel according to claim 10, wherein the bearing has a substantially circular shape.

12. The lens barrel according to claim 10, wherein
   the bearing includes an inner ring mountable on the lens unit,
   the bearing includes an outer ring mountable on the unit holder, and
   the inner ring of the bearing is attracted in an optical axis direction by a magnetic force of the second magnet.

13. The lens barrel according to claim 10, further comprising a sliding bearing spaced apart from the bearing in an optical axis direction, wherein
   the lens unit is rotatably supported by the unit holder through the bearing and the sliding bearing.

14. The lens barrel according to claim 13, wherein the bearing and the sliding bearing are at end portions of the lens unit in the optical axis direction of the lens unit.

15. The lens barrel according to claim 1, further comprising a roll operation portion that includes the lens unit, wherein
   the roll operation portion is configured to pivot in the rolling direction with a first fulcrum being an optical axis, and
   a center of gravity of the roll operation portion is on the optical axis.

16. The lens barrel according to claim 15, further comprising a movable body that includes the roll operation portion, wherein
   the movable body is configured to move in at least one of the first direction or the second direction with a second fulcrum as a fulcrum axis,
   the fulcrum axis crosses the optical axis and is orthogonal to an optical axis direction, and
   a center of gravity of the movable body is on the fulcrum axis.

17. The lens barrel according to claim 16, wherein the center of gravity of the movable body matches an intersection point between the optical axis and the fulcrum axis.

18. The lens barrel according to claim 1, further comprising a unit holder configured to support the lens unit, wherein
   the mounting body includes the unit holder, and
   the lens unit is configured to rotate with respect to the unit holder in the rolling direction.

19. An imaging apparatus, comprising:
   an imaging element configured to convert, into an electrical signal, an optical image captured by an optical system;
   a lens unit that includes at least one lens;
   a first magnet configured to execute image stabilization in at least one of a first direction or a second direction;
   a second magnet configured to execute image stabilization in a rolling direction;
   a first magnetic circuit that includes a first coil and the first magnet, wherein the first coil is configured to move the lens unit in at least one of the first direction or the second direction;
   an additional magnetic circuit that includes a second coil and the second magnet, wherein the second coil is configured to rotate the lens unit in the rolling direction; and
   a mounting body that includes a yoke, wherein
      the yoke includes:
         a first magnet mounting portion, wherein the first magnet is on the first magnet mounting portion; and
         a second magnet mounting portion orthogonal to the first magnet mounting portion,
      the second magnet is on the second magnet mounting portion,
      the first magnet mounting portion is closer to the lens unit than the first coil, and
      in a case where the lens unit is moved in at least one of the first direction or the second direction, the first magnet, the second magnet, and the mounting body are moved.

* * * * *